(12) United States Patent
Choi et al.

(10) Patent No.: US 10,818,442 B2
(45) Date of Patent: Oct. 27, 2020

(54) METHOD OF FABRICATING METAL OXIDE FILM

(71) Applicant: KOREA UNIVERSITY RESEARCH AND BUSINESS FOUNDATION, Seoul (KR)

(72) Inventors: Won-joon Choi, Seoul (KR); Tae-han Yeo, Seoul (KR); Dong-joon Shin, Incheon (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 108 days.

(21) Appl. No.: 16/220,238

(22) Filed: Dec. 14, 2018

(65) Prior Publication Data

US 2019/0198262 A1    Jun. 27, 2019

(30) Foreign Application Priority Data

Dec. 27, 2017    (KR) .......................... 10-2017-0180874

(51) Int. Cl.
| | | |
|---|---|---|
| *H01G 11/86* | (2013.01) | |
| *H01G 11/36* | (2013.01) | |
| *H01G 11/46* | (2013.01) | |
| *C01B 32/162* | (2017.01) | |
| *C01G 45/02* | (2006.01) | |

(52) U.S. Cl.
CPC .......... *H01G 11/86* (2013.01); *C01B 32/162* (2017.08); *C01G 45/02* (2013.01); *H01G 11/36* (2013.01); *H01G 11/46* (2013.01); *C01P 2002/85* (2013.01); *C01P 2004/16* (2013.01); *C01P 2004/32* (2013.01); *C01P 2004/64* (2013.01); *C01P 2006/16* (2013.01); *C01P 2006/40* (2013.01)

(58) Field of Classification Search
CPC .............................. C01B 32/162; H01G 11/86
USPC ......................................................... 427/212
See application file for complete search history.

(56) References Cited

FOREIGN PATENT DOCUMENTS

| KR | 10-2013-0141407 A | 12/2013 |
|---|---|---|
| KR | 10-2014-0075275 A | 6/2014 |
| KR | 10-1754018 B1 | 7/2017 |

OTHER PUBLICATIONS

Yeo, DC-field-driven combustion waves for one-step fabrication of reduced manganese oxide/multi-walled carbon nanotube hybrid nanostructures as high-performance supercapacitor electrodes, J. Mater. Chem. A, 2017, 5, p. 24707-24719 (Year: 2017).*
Shin, Facile One-pot Transformation of Iron Oxides from Fe2O3 Nanoparticles to Nanostructured Fe3O4@C Core-Shell Composites via Combustion Waves, Scientific Reports, Feb. 2016, p. 1-10 (Year: 2016).*
Lee, Manipulation of combustion waves in carbon-nanotube/fuel composites by highly reactive Mg nanoparticles, Nanoscale, 2015, 7, 17071 (Year: 2015).*

(Continued)

*Primary Examiner* — Tabatha L Penny
(74) *Attorney, Agent, or Firm* — Hauptman Ham, LLP

(57) ABSTRACT

A method of fabricating a metal oxide film includes sequentially laminating a carbon film and a metal oxide film including nano-sized metal oxide nanoparticles on a porous fuel membrane to form a preliminary composite structure and reducing the metal oxide film to form a composite structure by combusting the porous fuel membrane while applying a voltage to the preliminary composite structure.

10 Claims, 26 Drawing Sheets

(56) References Cited

OTHER PUBLICATIONS

Shin et al., "Facile One-pot Transformation of Iron Oxides from Fe2O3 Nanoparticles to Nanostructured Fe3O4@C Core-Shell Composites via Combustion Waves," Scientific Reports, Feb. 23, 2016, vol. 6, issue No. 21792, pp. 1-10.
Korean Office Action dated Feb. 25, 2019, issued in corresponding Korean Patent Application No. 10-2017-0180874.

\* cited by examiner

METHOD OF FABRICATING METAL OXIDE FILM

CROSS-REFERENCE TO RELATED APPLICATIONS

This U.S. non-provisional patent application claims priority under 35 U.S.C. § 119 to Korean Patent Application No. 10-2017-0180874, filed on Dec. 27, 2017, in the Korean Intellectual Property Office, the entire contents of which are hereby incorporated by reference.

TECHNICAL FIELD

The present disclosure relates to a method of fabricating a metal oxide film and, more particularly, to a method of fabricating a metal oxide film having a structure-controlled metal oxide on a carbon nanotube.

BACKGROUND

A major task of an electrochemical device based on a metal oxide is to address low electrical conductivity, physical/chemical degradation, and a structural thermal stability problem to improve performance. To this end, researches into a carbon-based material/metal oxide composite structure have been intensively conducted. Carbon-based nanomaterials may be used to effectively protect electrodes by providing an additional conductive channel during operation of an electrochemical device and providing thermal/chemical reactivity and excellent mechanical stability. Additionally, a metal oxide electrode having specially designed geometrical characteristics such as a nanorod, a nanotube or the like provides improved surface area and electrical conductivity to facilitate development of a high-performance supercapacitor.

In general, a separate apparatus and a special environment (vacuum and high temperature) are required to synthesize a metal oxide having micro-sized and nano-sized structures. Therefore, long process time and high cost are consumed. Moreover, there are unsolved problems such as aggregation and chemical transformation of an oxide occurring during a manufacturing process such as sol-gel method and chemical vapor deposition which are general synthetic methods. Accordingly, a manufacturing method having a short process time, low cost, and high stability needs to be developed to improve electrochemical performance and economical efficiency of a composite electrode of a metal oxide and a carbon nanotube having a controlled nanostructure.

Korean Patent Registration No. 10-1754018 discloses a method of reducing metal oxide nanoparticles using combustion waves and simultaneously coating carbon on surfaces of the nanoparticles. However, this drop-cast method provides nanoparticles aggregated with each other.

SUMMARY

An aspect of the present disclosure is to provide a method of synthesizing a composite having a carbon-based material/structure-controlled metal oxide nanostructure composite. Accordingly, a high cost, a long period time, and a high-temperature synthesis time, which are generally required to prepare a carbon-based material/structure-controlled metal oxide nanostructure composite, may be reduced and process complexity may be reduced.

A detailed aspect of the present disclosure is to provide a method of synthesizing a composite having a carbon-based material/structure-controlled metal oxide nanostructure controlling a metal oxide nanostructure when a chemical fuel constituting a porous fuel membrane is combusted by applying a direct current to a carbon-based material in a porous fuel membrane/carbon-based material/metal oxide preliminary composite structure. Accordingly, a surface area of the metal oxide may be actively controlled.

According to an aspect of the present disclosure, a method of fabricating a metal oxide film includes sequentially laminating a carbon film and a metal oxide film including nano-sized metal oxide nanoparticles on a porous fuel membrane to form a preliminary composite structure and reducing the metal oxide film to form a composite structure by combusting the porous fuel membrane while applying a voltage to the preliminary composite structure.

In example embodiments, the sequentially laminating a carbon film and a metal oxide film including nano-sized metal oxide nanoparticles on a porous fuel membrane to form a preliminary composite structure may include dispersing a carbon nanotube or a graphene in a first dispersing agent solution to prepare a carbon-containing solution, dispersing the metal oxide nanoparticles in a second dispersing agent solution to prepare a nanoparticle solution, forming a carbon film on the porous fuel membrane using vacuum filtration of the carbon-containing solution, forming the metal oxide film on the carbon film using vacuum filtration of the metal oxide nanoparticle solution, and evaporating the first dispersing agent solution and the second dispersing agent solution in the metal oxide film, the carbon film, and the porous fuel membrane to form the preliminary composite structure.

In example embodiments, in the reducing the metal oxide film to form a composite structure by combusting the porous fuel membrane while applying a voltage to the preliminary composite structure, a combustion wave combusts the porous fuel membrane to heat the metal oxide nanoparticles, a DC current applied to the preliminary composite structure may induce arc discharge on a surface of the carbon film to evaporate the metal oxide nanoparticles, and the metal oxide nanoparticles may be reduced to control a structure thereof while the metal oxide nanoparticles are cooled after generation of the combustion wave.

In example embodiments, the porous fuel membrane may be nitrocellulose.

In example embodiments, the metal oxide nanoparticles may include $MnO_2$, and a reduced metal oxide may include at least one of $Mn_2O_3$, $Mn_3O_4$, and $MnO$.

In example embodiments, each of the metal oxide nanoparticles may have a diameter of 10 nanometers to 200 nanometers.

In example embodiments, each of the metal oxide nanoparticles may have a spherical shape, and a reduced metal oxide may have a rod shape or a rounded polyhedral shape.

In example embodiments, a nanostructure having the rod shape may have a length of 50 nanometers to 700 nanometers and a thickness of 5 nanometers to 50 nanometers.

In example embodiments, the voltage may be a direct current (DC) voltage or an alternating current (AC) voltage.

In example embodiments, the carbon film may be a carbon nanotube filtration film or a graphene filtration film.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

FIG. 1A illustrates a method of fabricating a metal oxide film according to an example embodiment of the present disclosure.

FIG. 1B illustrates a method of fabricating a metal oxide film according to an example embodiment of the present disclosure.

FIG. 1C illustrates a method of fabricating a metal oxide film according to an example embodiment of the present disclosure.

FIG. 1D illustrates a method of fabricating a metal oxide film according to an example embodiment of the present disclosure.

DETAILED DESCRIPTION

Figure 1A:
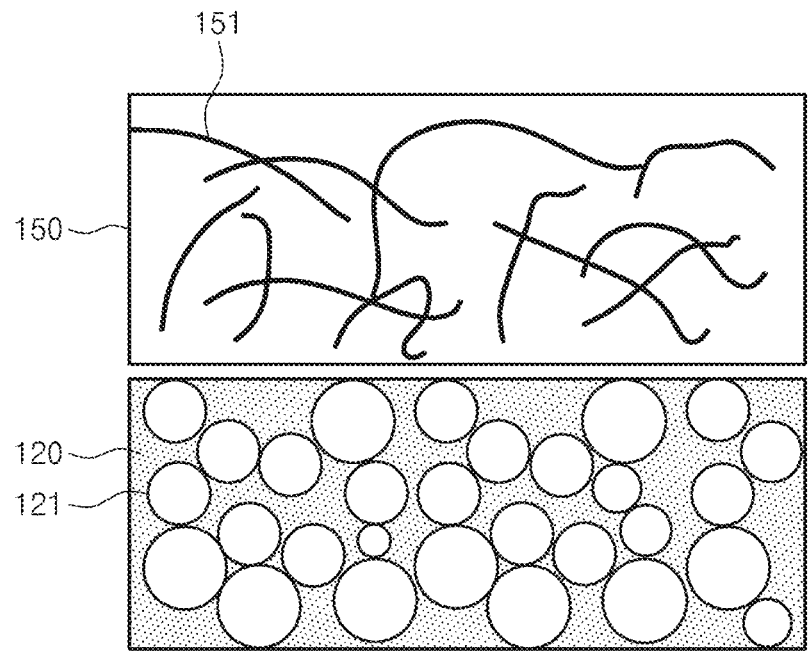
FIGS. 1A to 1D illustrate a method of fabricating a metal oxide film according to an example embodiment of the present disclosure.

The development of an efficient and reliable energy storage system (ESS) is essential to implement large-scale next-generation technology into small-sized devices such as portable devices, electric vehicles, smart grid systems, and renewable energy systems. Electrochemical energy conversion is a core technology, which has been explored most widely in energy storage systems due to potential thereof to obtain high specific power and energy density. In particular, supercapacitors using electrostatic double-layer capacitance (EDLC) and electrochemical pseudo-capacitance have been attractive due to specific power, high charging-discharging rates, long-term stability, and efficient packaging. Researches into pseudo-capacitors have been intensively conducted to increase energy density and improve the long-term charge-discharge stability based on oxidation and redox reactions of electrodes. On the other hand, electrostatic double layer capacitance was used to improve the specific power using electrostatic attraction of an electrode surface. In recent years, low cost and rapid processes are major tasks in efficiently manufacturing high-performance supercapacitors.

A micro-nanostructure metal oxide has a pseudocapacitive material promoting electron charge transfer induced at a boundary by electrosorption, redox reactions, and intercalation processes. In particular, a manganese oxide is considered a strong candidate material for a high-capacitance electrode. The manganese oxide has theoretically high capacitance of 1380 F/g, a wide operating voltage range, efficient redox reactions, and environmental-friendly properties. However, the low electrical conductivity and physiochemical degradation of manganese oxide-based electrodes is a major issue resulting in deterioration and structural instability of capacitance. Accordingly, researches into a hybrid structures including carbon-based materials and other metal oxides have been intensively conducted to overcome such an important barrier. Multi-walled carbon nanotubes (MWCNT), graphite, and graphene may provide a conductive channel as an additional path for charge transport and may be used as electrostatic double layer capacitance in a supercapacitor electrode.

Due to low thermal-chemical reactivity and high mechanical stability of such carbon-based materials, the carbon-based materials may used to effectively protect electrodes from physical chemical degradation. A hybrid structure of various metal oxides have been developed to increase long-term charge-discharge stability, specific capacitance, and areal capacitance. In particular, multiple redox reactions among a manganese oxide, a cobalt oxide, and a ruthenium oxide may improve capacitance under a wide range of operating conditions. On the other hand, a titanium oxide may provide excellent thermal-chemical-structural stability to prevent aggregation of a micro-nanostructure under high-temperature heat treatment conditions. A manganese oxide having a geometrically designed shape, such as a nanorod and a nanotube, may provide improved surface area and inter-conductivity in a metal oxide-based electrodes to facilitate development of high-performance supercapacitors.

On the other hand, synthesis or manufacturing of a supercapacitor electrode having a hybrid structure based on a manganese oxide having a micro-nanostructure are performed in a special environment with a large-volume apparatus and a controlled gas flow and requires a long-term process and a high cost. Typical synthesis of the manganese oxide-based electrode was performed via a sol-gel method, a chemical vapor deposition method, and a hydrothermal method. During such a manufacturing process, physicochemical degradation such as aggregation and chemical transformation occurs inevitably at oxide exposition and chemical reaction conditions at a high temperatures for a long period of time.

Although a relatively simple method using combustion has been researched, agglomeration or physicochemical transition of the manganese oxide nanostructure remains unsolved. Accordingly, there is a need for a new efficient method of manufacturing a micro-nanostructure having a heterogeneous shape without a complex process. Such a new efficient manufacturing method may provide a supercapacitor having improved capacitance, long-term stability, and cost-effective manufacturing.

Example embodiments of the present disclosure will now be described below more fully with reference to accompanying drawings. The present disclosure may, however, be embodied in different forms and should not be constructed as limited to the embodiments set forth herein. Rather, these embodiments are provided so that this disclosure will be thorough and complete, and will fully convey the scope of the present invention to those skilled in the art.

FIGS. 1A to 1D illustrate a method of fabricating a metal oxide film according to an example embodiment of the present disclosure.

Referring to FIG. 1A to 1D, a method of fabricating a metal oxide film includes sequentially laminating a carbon film 150 and a metal oxide film 160 including nano-sized metal oxide nanoparticles 161 on a porous fuel membrane 120 to form a preliminary composite structure 101 and reducing the metal oxide film 160 to form a composite structure 102 by combusting the porous fuel membrane 120 while applying a voltage to the preliminary composite structure 101.

Sequentially laminating a carbon film 150 and a metal oxide film 160 including nano-sized metal oxide nanoparticles 161 on a porous fuel membrane 120 to form a preliminary composite structure 101 may include dispersing a carbon nanotube or a graphene in a first dispersing agent solution to prepare a carbon-containing solution, dispersing the metal oxide nanoparticles 161 to a second dispersing agent solution in prepare a nanoparticle solution, forming a carbon film 150 on the porous fuel membrane 120 using vacuum filtration of the carbon-containing solution, forming the metal oxide film 160 on the carbon film using vacuum filtration of the metal oxide nanoparticle solution, and vaporizing the first dispersing agent solution and the second dispersing agent solution in the metal oxide film 160, the carbon film 150, and the porous fuel membrane 120 to form the preliminary composite structure 101.

The metal oxide nanoparticles 161 may include $MnO_2$, and the reduced metal oxide film may include at least one of $Mn_2O_3$, $Mn_3O_4$, and MnO. Each of the metal oxide nanoparticles 161 may have a spherical shape and may have a diameter of 10 nanometers (nm) to 200 nm. Preferably, each of the oxide nanoparticles 161 may have a diameter of 10 nm to 30 nm.

A reduced metal oxide 262 has a rod shape or a rounded polyhedral shapes. A nanostructure having the rod shape has a length of 50 nm to 700 nm and a thickness of 5 nm to 50 nm.

The carbon film 150 may be a carbon nanotube filtration film or a graphene filtration film. The carbon film 150 may be formed through a vacuum filtration method. The porous fuel membrane 120 may be nitrocellulose. The porous fuel membrane 120 may include pores 121. Each of the pores 121 may have a diameter of 0.1 micrometer (μm). The preliminary composite structure 101 may include a porous fuel membrane 120, a carbon film 150, and a metal oxide film 160 to which metal oxide nanoparticles are fixed, which are sequentially laminated.

A carbon nanotube or a graphene is dispersed in a first dispersing agent solution to prepare a carbon-containing solution. The first dispersing agent solution may be deionized water (DI water). The carbon nanotube may be a multi-walled carbon nanotube (MWCNT). The multi-walled carbon nanotube may have a length of 0.9 μm to 1.0 μm and an outer diameter of 20 nm to 40 nm. The carbon nanotube or the graphene may be dispersed in deionized water (5 mg $mL^{-1}$), and 1 weight percent (wt %) sodium dodecyl sulfate (SDS) may be added as a surfactant. A carbon-containing solution may be dispersed using a sonicator for several hours.

The metal oxide nanoparticles 161 are dispersed in a second dispersing agent solution to prepare a metal oxide nanoparticle solution. The second dispersing agent solution may be deionized water (DI water). The metal oxide nanoparticles 161 are dispersed in DI water (5 mg $mL^{-1}$), and 1 wt % sodium dodecyl sulfate (SDS) may be added as a surfactant. The metal oxide nanoparticle solution may be dispersed using a sonicator for several hours.

Referring to FIG. 1A, the carbon-containing solution may be provided to form the carbon film 150 on the porous fuel membrane 120 using a vacuum filtration method.

Figure 1B:
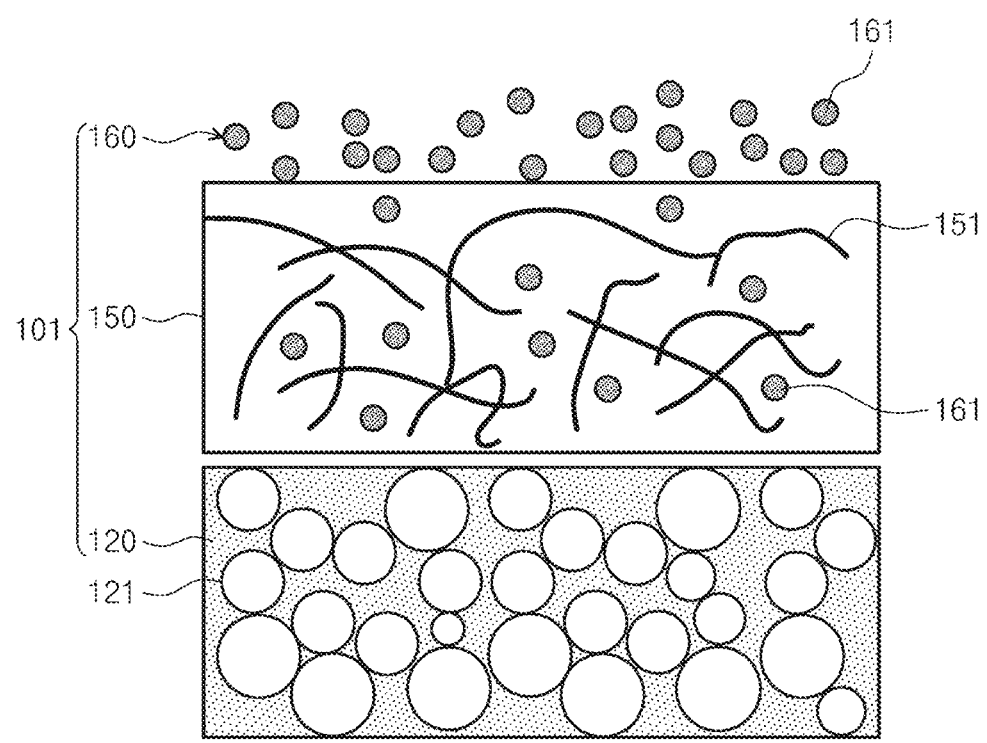

Referring to FIG. 1B, the metal oxide nanoparticle solution may be provided to form the metal oxide layer 160 on the carbon film 150 using a vacuum filtration method. A mass of the metal oxide nanoparticles 161 constituting the metal oxide layer 160 may be 5 milligram (mg), and a mass of the carbon film 150 may be 15 mg.

A preliminary composite structure 101 may be manufactured by evaporating a first dispersing agent and a second dispersing agent in the metal oxide layer, the carbon film, and the porous fuel membrane. The evaporating a first dispersing agent and a second dispersing agent may be performed at a room temperature and under an atmospheric pressure. The preliminary composite structure 101 may be cut into a rectangular shape. The preliminary composite structure 101 may be turned over and may be fixed to a ceramic plate by providing a copper tape as an electrode on both ends thereof. A conductive paste may be disposed on a contact interface in such a manner that the preliminary composite structure 101 and the copper tape are in stable contact with each other.

Figure 1C:
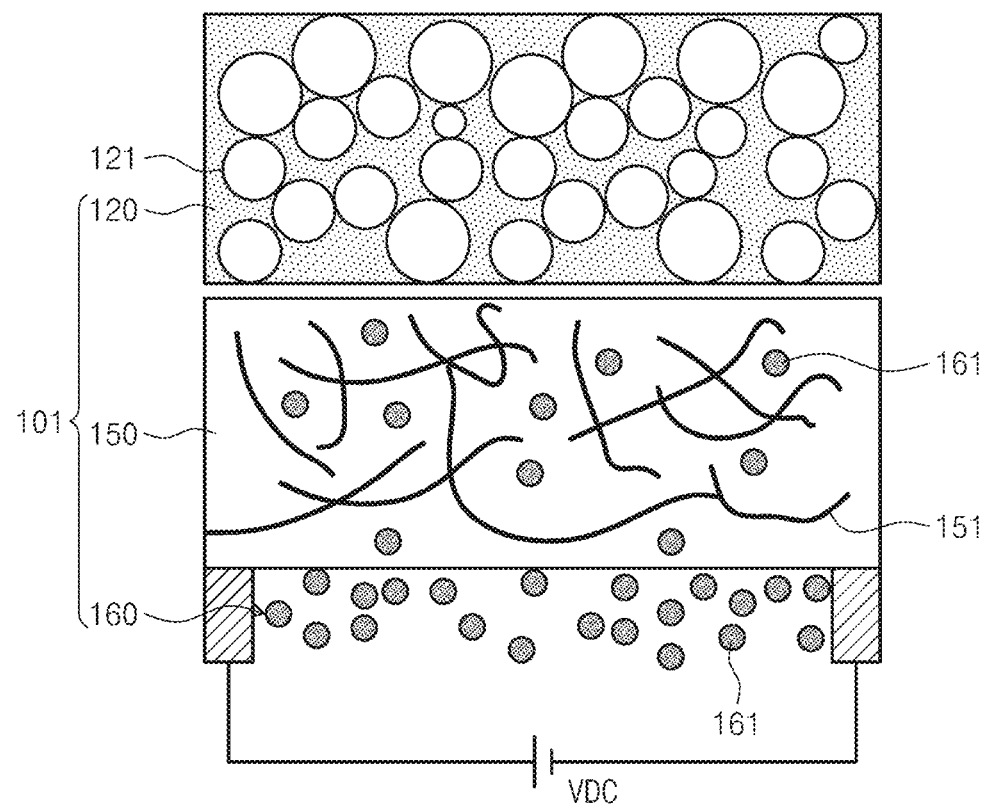
Figure 1D:
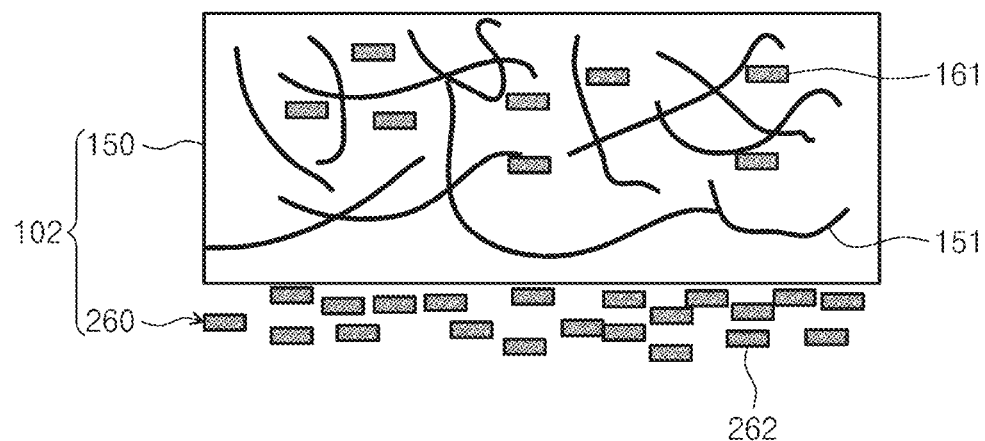

Referring to FIGS. 1C and 1D, in the reducing the metal oxide film 160 to form a composite structure 102 by combusting the porous fuel membrane 120 while applying a voltage to the preliminary composite structure 101, a combustion wave combusts the porous fuel membrane 120 to heat the metal oxide nanoparticles, a DC current applied to the preliminary composite structure 101 induces arc discharge on a surface of the carbon film 150 to evaporate the metal oxide nanoparticles 161, and the metal oxide nanoparticles 161 are reduced to control a structure thereof while the metal oxide nanoparticles 161 are cooled after generation of the combustion wave.

A voltage may be a DC voltage or an AC voltage, and may be applied to both the ends of the preliminary composite structure through the copper tape as an electrode. The DC voltage may be supplied by a DC power supply. The DC voltage may range from several tens of volts to several hundreds of volts.

If a DC voltage is applied through both the electrodes 163, a carbon-based material is heated by a Joule heating effect and a chemical fuel is combusted when the temperature rises above an ignition point of the chemical fuel. In this case, the metal oxide nanoparticles are supplied with high energy by combustion heat and discharge of the chemical fuel due to arc discharge on a surface of a carbon material. Accordingly, the metal oxide nanoparticles grow along a crystal surface during vaporization and cooling thereof and grow into nano-sized rods or circular polyhedrons. When the electrode is removed after the combustion, a film of carbon-based material/structure-controlled metal oxide may be obtained.

The porous fuel membrane may be ignited by the DC voltage, and the combustion wave may propagate along the preliminary composite structure. The DC voltage may continue to be applied while the combustion wave propagates. The DC voltage may allow the carbon film to be Joule-heated. Thus, the carbon film may be heated at a higher temperature than in a case in which the carbon film is heated by only the combustion wave. In addition, the DC voltage may cause field emission or arc discharge in a carbon nanotube of the carbon film. Such field electron emission or arc discharge, Joule heating, and heating performed by the fuel may evaporate the metal oxide nanoparticles. Accordingly, the metal oxide nanoparticles may be reduced to control a structure thereof while the metal oxide nanoparticles are cooled after generation of the combustion wave. Specifically, $MnO_2$ nanoparticles may be reduced to a material containing $Mn_2O_3$, $Mn_3O_4$, and MnO after a structure thereof is controlled. In addition, the reduced metal oxide may grow into a rod-like crystal structure.

The reduction of the metal oxide nanoparticles may depend on a concentration of oxygen in the air in a combustion state. When an inert gas such as argon is mixed to decrease the concentration of oxygen in the air, $MnO_2$ nanoparticles may be reduced to be transformed into a substance, which mainly contains MnO, after a structure thereof is controlled.

Figure 2:
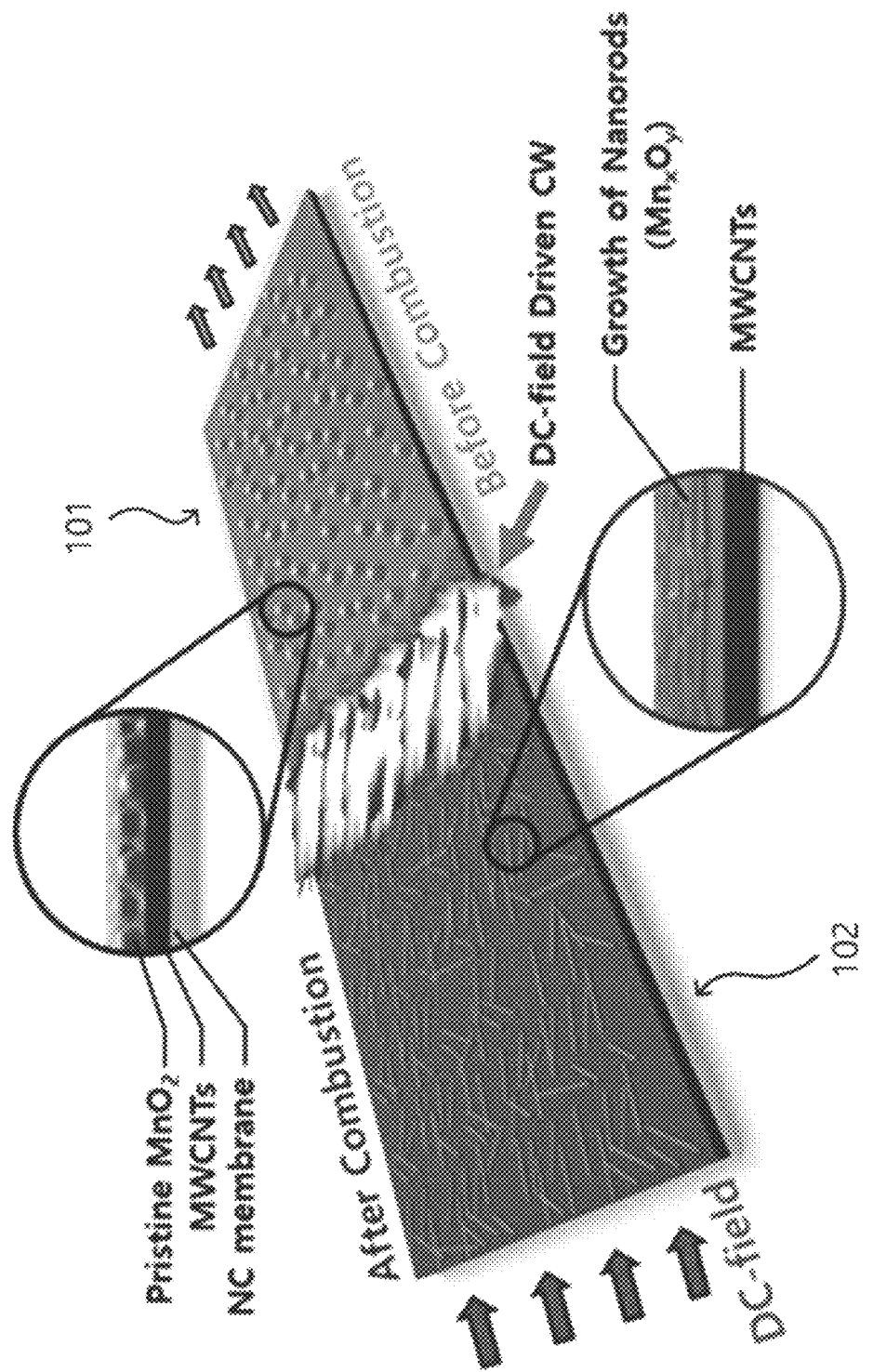
FIG. 2 is a conceptual diagram illustrating a method of fabricating a metal oxide film according to another example embodiment of the present disclosure.

FIG. 2 is a conceptual diagram illustrating a method of fabricating a metal oxide film according to another example embodiment of the present disclosure.

Referring to FIG. 2, a composite structure 102 may be a reduced manganese oxide/NWCNT hybrid nanostructure. The composite structure 102 may be used as a high-performance supercapacitor electrode. A direct current (DC) field-driven combustion waves method for synthesizing the composite structure 102 will be described below.

A layered film of an MWCNT 151 and $MnO_2$ nanoparticles 161 is formed on the porous fuel membrane 120 using a vacuum filtration method. The porous fuel membrane 120 may be nitrocellulose. A DC field is applied to both ends of the layered film 160 while the combustion wave propagates in the porous fuel membrane 120. The combustion waves propagate along an interface between the MWCNT 151 and the porous fuel membrane 120. Simultaneously, high thermal energy is instantaneously supplied to an entire area of a $MnO_2$ nanoparticles/MWCNT laminated structure to form a hybrid nanostructure including $Mn_xO_y$ and MWCNT as an integrated film. The hybrid nanostructure or the composite structure 102 is used as a supercapacitor electrode without performing an additional process. In the manufacturing process, the DC field may be used as an ignition source of the combustion wave, a preheating source of the $MnO_2$/

MWCNT structure for amplifying reaction waves, and a source of arc discharge for growing a nanorod-shaped manganese oxide.

Simultaneously, a MWCNT layer 150 may serve as an interface layer to prevent a conductive network and the manganese oxide from being in direct contact with the flame during propagation of the combustion wave in the distribution of the DC field.

To investigate contribution of the DC field, a film produced by laser-irradiation-driven combustion waves (LI-CW) without DC fields and a $MnO_2$/MWCNT film were invested by the same physicochemical characterization analysis.

The $Mn_xO_y$/MWCNT film produced by the DC field-driven combustion waves method include a mixed structure of $Mn_xO_y$ nanoparticles and nanorods without aggregation. However, laser irradiation-driven combustion waves produced only $Mn_xO_y$ nanoparticles and caused severe aggregation.

A $MnO_2$ nanoparticle/MWCNT electrode, a $MnO_2$/MWCNT electrode formed by laser irradiation-driven combustion waves, and a $Mn_xO_y$/MWCNT electrode formed by DC field-driven combustion waves were used as supercapacitor electrodes, respectively, and characteristics thereof were investigated.

A hybrid $Mn_xO_y$/MWCNT structure fabricated by applying the DC field-driven combustion waves has excellent specific capacitance and charge-discharge cycling stability due to improved inter-conductivity and contact interfaces in a less aggregated nanostructure. The DC field-driven combustion waves method may be used to produce hybrid materials of various metal oxides and micro-nanostructures. The DC field-driven combustion waves method provides the advantages such as low cost and high-speed processing. In addition, unique characteristics of metal oxides, such as the growth of anisotropic nanostructures using arc discharge between nanostructures, may improve performance for various electrochemical applications such as a battery and a photocatalyst as well as a supercapacitor.

Manufacturing and Characterization of Electrochemical Device as Supercapacitor Electrode Three electrodes (a $MnO_2$/MWCNT electrode, a $MnO_2$/MWCNT electrode fabricated by applying laser irradiation-driven combustion waves, and a $MnxOy$/MWCNT electrode fabricated by applying DC field-driven combustion waves) had the same dimensions (1×1 cm²) and were directly used as supercapacitor electrodes. A $Mn_xO_y$ nanostructure and a MWCNT act as an active material and a collector. A half-cell three-electrode electrochemical cell method was used to analyze cyclic voltammetry, current charge-discharge behavior, and stability during cycling tests. A working electrode is a film of $Mn_xO_y$/MWCNT, a reference electrode is Ag/AgCl, and a counter electrode is a platinum (Pt) wire. An aqueous $Na_2SO_4$ solution (1M) was used as an electrolyte. All electrochemical measurements were performed using potentiostat/galvanostat.

Manufacturing of $Mn_xO_y$/MWCNT Hybrid Nanostructure Using Combustion Waves

FIGS. 3A~3I illustrate a method of fabricating a metal oxide film according to another example embodiment of the present disclosure.

Figure 3A:
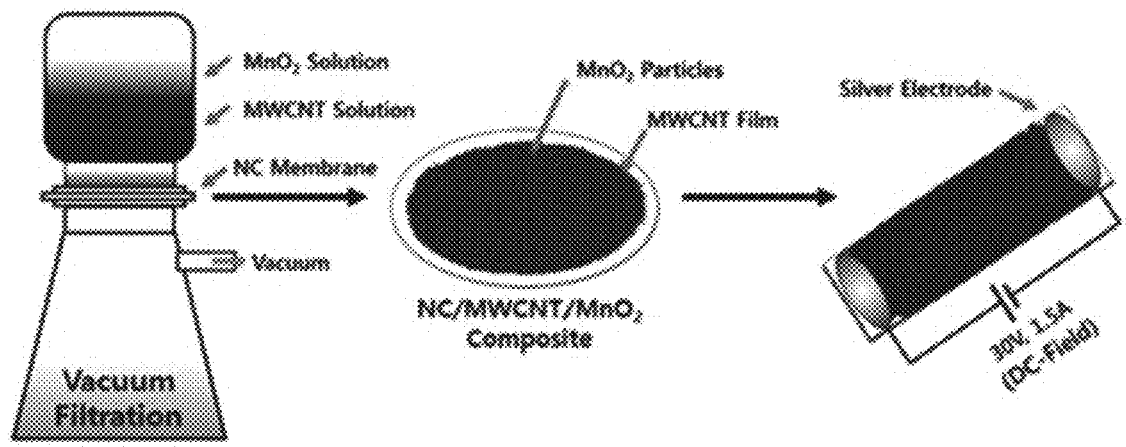
FIG. 3A illustrates a method of fabricating a metal oxide film according to another example embodiment of the present disclosure.

Referring to FIG. 3A, a MWCNT and $MnO_2$ nanoparticles were vacuum-filtered through a porous fuel membrane to form a $MnO_2$/MWCNT electrode. The vacuum-filtered MWCNT and $MnO_2$ nanoparticle were dried at a room temperature for 24 hours.

Figure 3B:
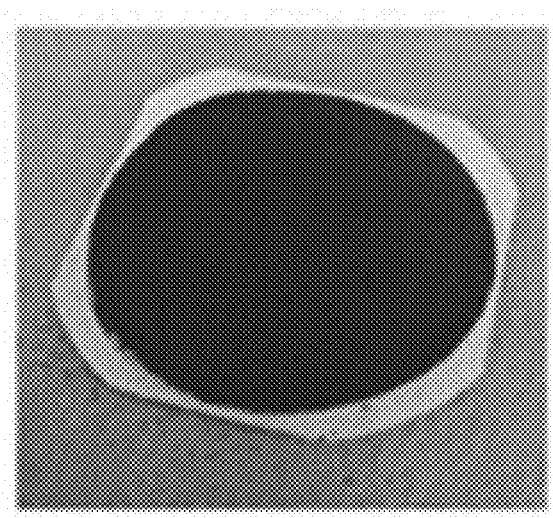
FIG. 3B illustrates a preliminary composite structure of the laminated $MnO_2$/MWCNT/porous fuel membrane according to another example embodiment of the present disclosure.
Figure 3C:
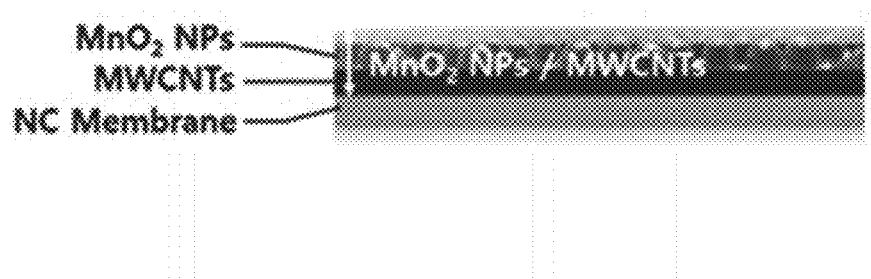
FIG. 3C illustrates a preliminary composite structure of the laminated $MnO_2$/MWCNT/porous fuel membrane according to another example embodiment of the present disclosure.

Referring to FIGS. 3B and 3C, a laminated structure of the $MnO_2$ nanoparticles, the MWCNT, and the porous fuel membrane was fabricated as an initial sample for application of combustion waves. A preliminary composite structure of the laminated $MnO_2$/MWCNT/porous fuel membrane is cut into rectangular samples (10×24 mm2) and is turned over to implement a porous fuel membrane/MWCNT/$MnO_2$ structure as a final laminated structure.

Figure 3D:
FIG. 3D illustrates laser irradiation-driven combustion waves according to another example embodiment of the present disclosure.
Figure 3E:
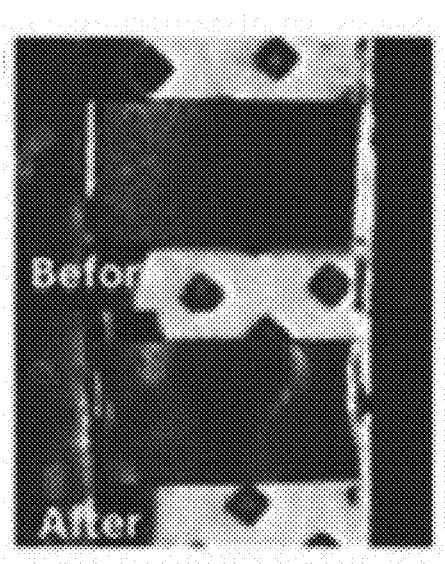
FIG. 3E illustrates laser irradiation-driven combustion waves according to another example embodiment of the present disclosure.

Referring to FIGS. 3D and 3E, laser irradiation-driven combustion waves were used to synthesize a hybrid film of $Mn_xO_y$ and MWCNT. An initial combustion ignited by laser irradiation propagates throughout the porous fuel membrane to emerge as self-propagating combustion waves. The MWCNT and $MnO_2$ nanoparticles are exposed to a high temperature resulting from unique combustion of the porous fuel membrane. On the other hand, due to the MWCNT layer between the $MnO_2$ nanoparticles and the porous fuel membrane, the $MnO_2$ nanoparticles are not in contact with flame and do not produce an incompletely combusted carbonaceous fuel. Accordingly, thermal energy supplied within several seconds may indirectly affect the $MnO_2$ nanoparticles without direct-physicochemical contact. As a result, the laser irradiation-driven combustion waves affected the $MnO_2$ nanoparticles due to abnormal rapid temperature rise and fall, similarly to high-temperature annealing. Such an extreme environment changed physiochemical characteristics of manganese oxide nanoparticles as being visualized by changing a film color before and after application of the combustion waves.

Figure 3F:
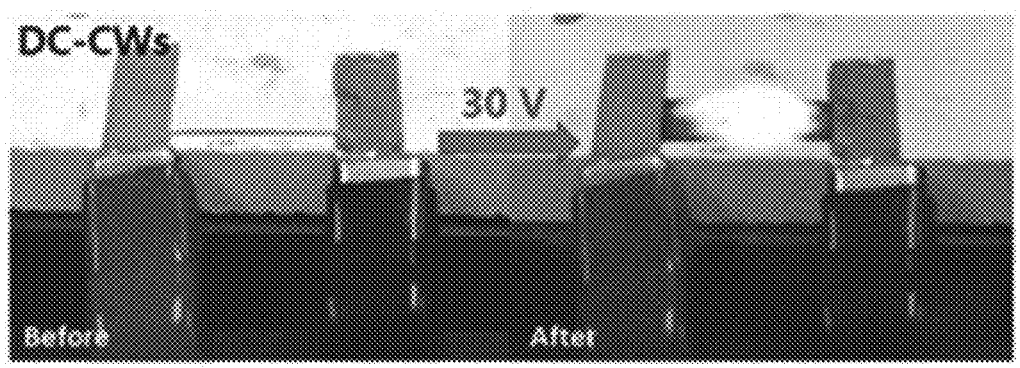
FIG. 3F illustrates a hybrid structure of $Mn_xO_y$ and MWCNT according to another example embodiment of the present disclosure.
Figure 3G:
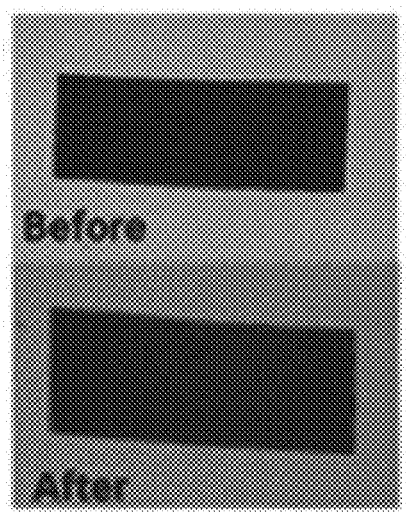
FIG. 3G illustrates a hybrid structure of $Mn_xO_y$ and MWCNT according to another example embodiment of the present disclosure.

Referring to FIGS. 3F and 3G, the hybrid structure of $Mn_xO_y$ and MWCNT was synthesized by applying DC field-driven combustion waves. Unlike laser irradiation-driven combustion waves, a direct current (DC) field between both ends of the laminated porous fuel membrane/MWCNT/$MnO_2$ structure is used to ignite the porous fuel membrane through a Joule heating mechanism. A maximum point of the thermal energy is disposed in a center of the film, and ignition occurs in a central region.

The DC field-driven combustion waves have two major differences from the laser-driven combustion waves. First, the DC-field is successively applied to the laminated porous fuel membrane/MWCNT/$MnO_2$. An electric field may affect formation of the MWCNT/$MnO_2$ structure. Second, the DC field passing through the MWCNT may provide additional thermal energy to the entire MWCNT/$MnO_2$ structure, similarly to a preheating effect. The DC field-driven combustion waves propagate faster than in the case of the laser irradiation-driven combustion waves. This characteristic affects the micro-nanostructure of $MnO_2$. However, the color change of the film is similar to that of a film produced by the laser irradiation-driven combustion waves.

Synthesis conditions established by combustion waves were investigated using an optical pyrometer capable of measuring real-time temperature variation.

Figure 3H:
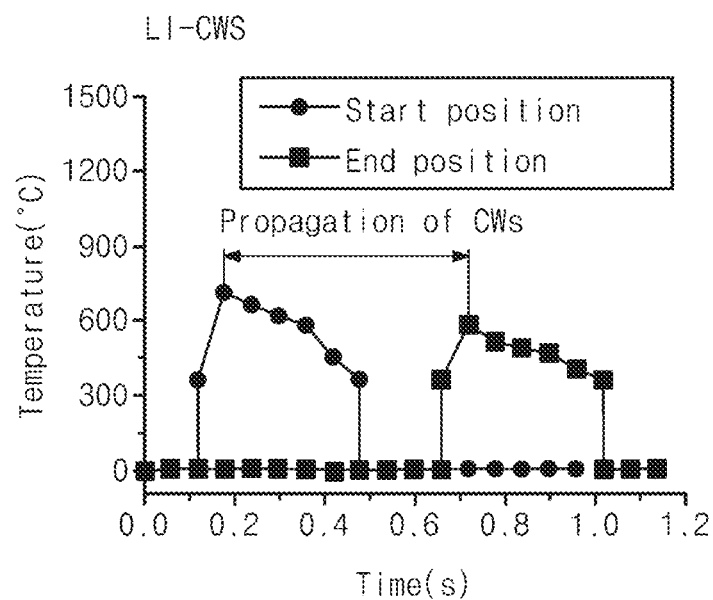
FIG. 3H illustrates a temperature with respect to time in the laser irradiation-driven combustion waves according to another example embodiment of the present disclosure.

Referring to FIG. 3H, the laser irradiation-driven combustion waves caused the creation of a high temperature region (maximum 709 degrees Celsius), and the temperature of an end position of the film was maintained low. Within one second, the combustion waves arrive at an end of a layer structure and reach a temperature of 580 degrees Celsius through a self-propagating reaction. On the other hand, a temperature of the start point is about 360 degrees Celsius due to cooling in an open-air environment. After the combustion waves propagate completely, an entire MWCNT/$MnO_2$-based film is cooled to a room temperature within one second. These synthesis conditions are different from the synthesis conditions provided in DC field-driven combustion waves.

Figure 3I:
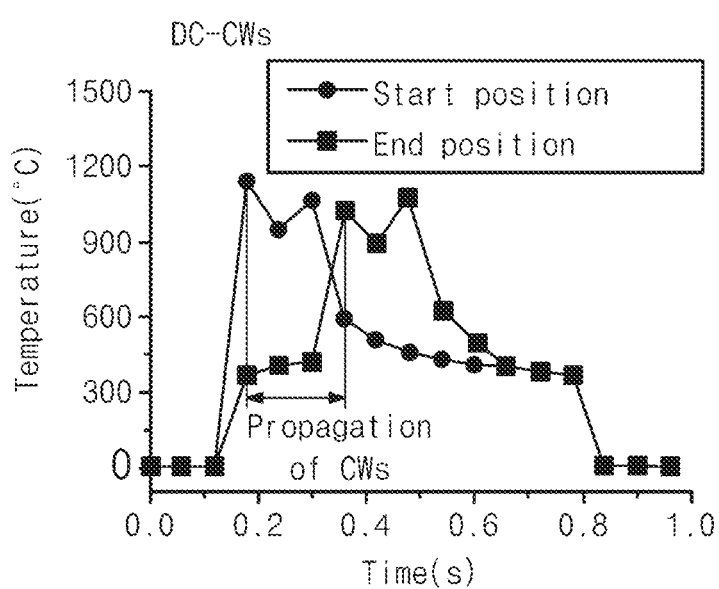
FIG. 3I illustrates a temperature with respect to time in the DC field-driven combustion waves according to another example embodiment of the present disclosure.

Referring to FIG. 3I, in the case of the DC field-driven combustion waves, a maximum temperature of the laminated structure is 1130 degrees Celsius and a temperature at the end position of the film at which the combustion waves has not yet reached increased to 400 degrees Celsius due to a preheating effect of the entire MWCNT. The thermal energy associated with the combustion waves propagate much faster than that in the laser irradiation-driven combustion waves and perfectly establishes a high-temperature environment within 0.16 second. In this regard, the DC field-driven combustion waves may provide rapid rise and fall in temperature as well as a uniform high temperature throughout the film.

Physiochemical Characteristics of Manufactured $Mn_xO_y$/MWCNT

Structural and chemical transitions were confirmed by investigating a micro-nanostructure of a hybrid film of $Mn_xO_y$/MWCNT.

FIGS. 4A-4H are SEM images illustrating a hybrid nanostructure after and before applying a combustion wave according to another example embodiment of the present disclosure.

Referring to FIGS. 4A-4H, a morphological transition, a dimensional change, and a nanostructure of three films (MWCNT/$MnO_2$, MWCNT/$Mn_xO_y$ to which a DC field-driven combustion wave is applied, and MWCNT/$Mn_xO_y$ to which a laser irradiation-driven combustion wave is applied) are shown.

Figure 4A:
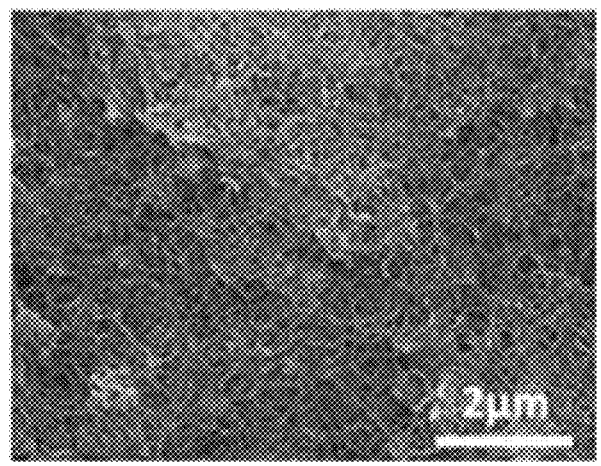
FIGS. 4A and 4B are SEM images illustrating MWCNT films as-prepared.
Figure 4B:
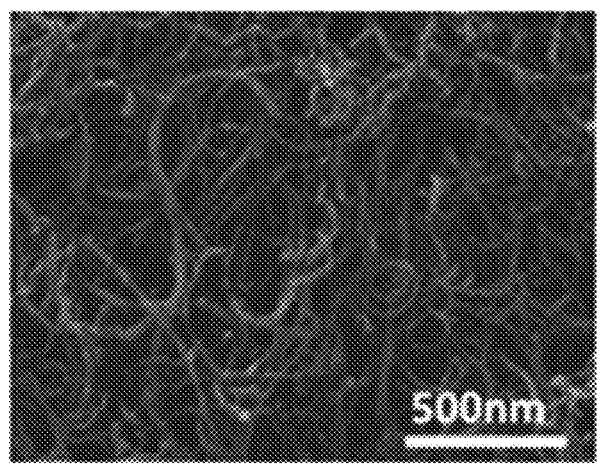

Referring to FIGS. 4A and 4B, MWCNT films each including only a vacuum-filtered MWCNT were randomly arranged in a porous fuel membrane and entangled percolation networks were formed.

Figure 4C:
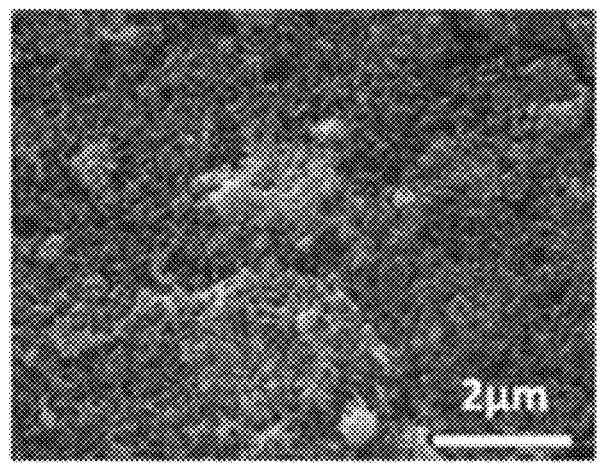
FIGS. 4C and 4D are SEM images illustrating $MnO_2$/MWCNT film without the application of combustion waves (CWs).
Figure 4D:
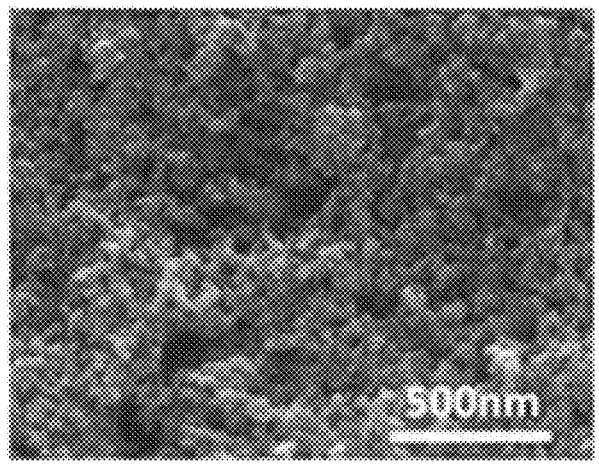

Referring to FIGS. 4C and 4D, sequential vacuum filtration of $MnO_2$ nanoparticles and removal of the porous fuel membrane were performed to produce samples without combustion waves. A hybrid structure shows high-density loading of $MnO_2$ nanoparticles surrounding individual MWCNTs. Each of the $MnO_2$ nanoparticles on the MWCNT has a diameter ranging from 30 nanometers (nm) to 40 nm, which is equal to an intrinsic dimension of the nanoparticles dispersed in deionized water (DI water).

The $MnO_2$ nanoparticles and the MWCNTs are in physical contact with each other through van der Waals force, while a large amount of $MnO_2$ nanoparticles are embedded between MWCNT films of a porous structure.

Figure 4E:
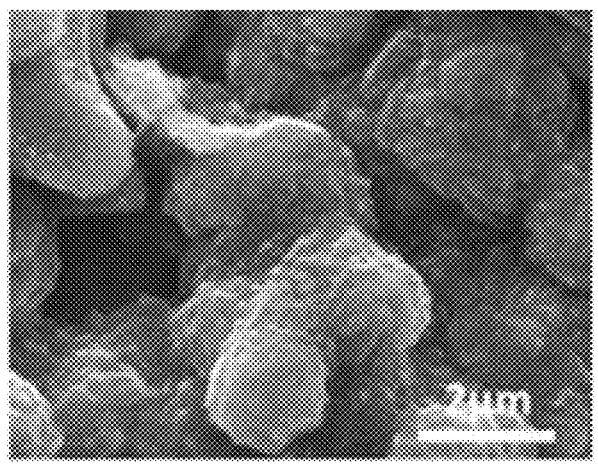
FIGS. 4E and 4F are SEM images illustrating $Mn_xO_y$/MWCNT hybrid structure fabricated by laser irradiation-driven combustion waves.
Figure 4F:
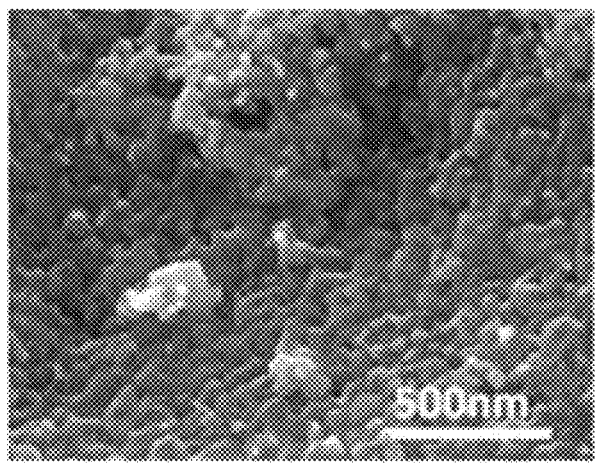

Referring to FIGS. 4E and 4F, a structural transition of $MnO_2$ nanoparticles induced by laser irradiation-driven combustion waves is shown. In the hybrid architecture, MWCNTs remain as percolation networks of nanotubes. On the other hand, $MnO_2$ nanoparticles are significantly aggregated by melting in a high-temperature environment in which they reach 709 degrees Celsius and last for several seconds. A melting point of manganese oxide is about 1650 degrees Celsius. Accordingly, the intrinsic structure should be maintained at a temperature of 709 degrees Celsius induced by combustion of the porous fuel membrane. However, most nanostructure metal oxides may be subjected to melting at a relatively lower temperature due to diffusion and surface boundary variations. In spite of a relatively lower temperature than the melting point of the manganese oxide, the laser irradiation-driven combustion waves induce structural and morphological changes in the $MnO_2$ nanoparticles and result in particle aggregation and a larger dimension. The melted manganese oxide nanoparticles adhere to a surface of the MWCNT during a cooling process. In this case, the manganese oxide nanoparticles aggregate, but a high temperature from the combustion waves lasts for only a few seconds and prohibits complete aggregation of the $MnO_2$ nanoparticles by a conventional annealing process. As a result, porosity of the $MnO_2$/MWCNT hybrid structure is maintained.

Figure 4G:
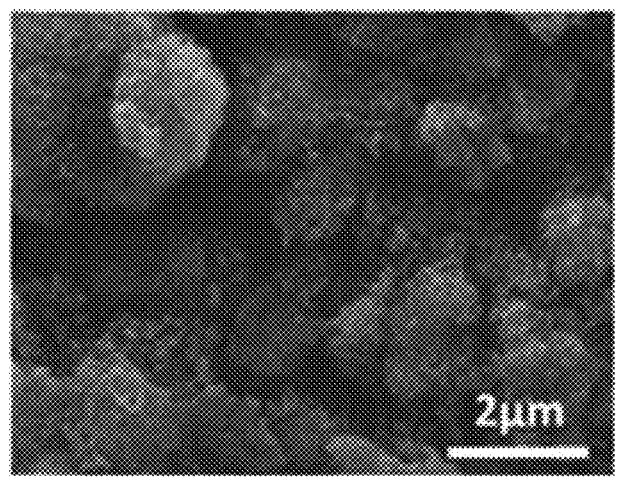
FIGS. 4G and 4H are SEM images illustrating $Mn_xO_y$/MWCNT hybrid structure fabricated by DC field-driven combustion waves.
Figure 4H:
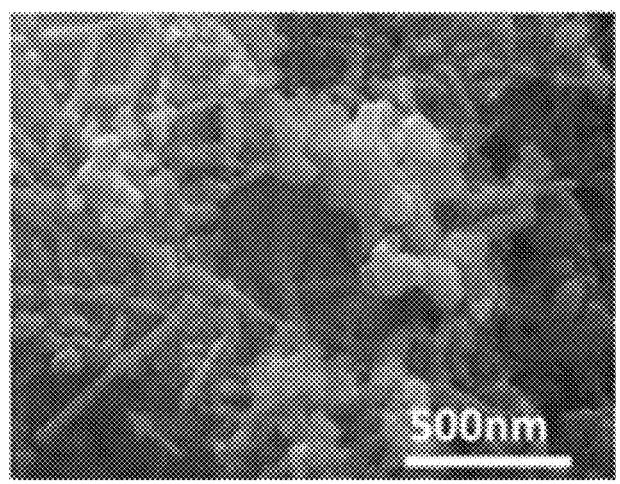

Referring to FIGS. 4G and 4H, the DC field-driven combustion waves provide formation of MWCNTs and manganese oxides having micro-nanostructures. Propagation of the DC field-driven combustion wave is 4.3 times faster than propagation of the laser irradiation-driven combustion wave and is completed in 0.16 seconds. Joule heating through a DC field preheats the entire MWCNT. An improved reaction rate allows high-temperature conditions to be achieved within a shorter time and allows morphology of the highly porous manganese oxide nanoparticles to be preserved better.

Figure 5:
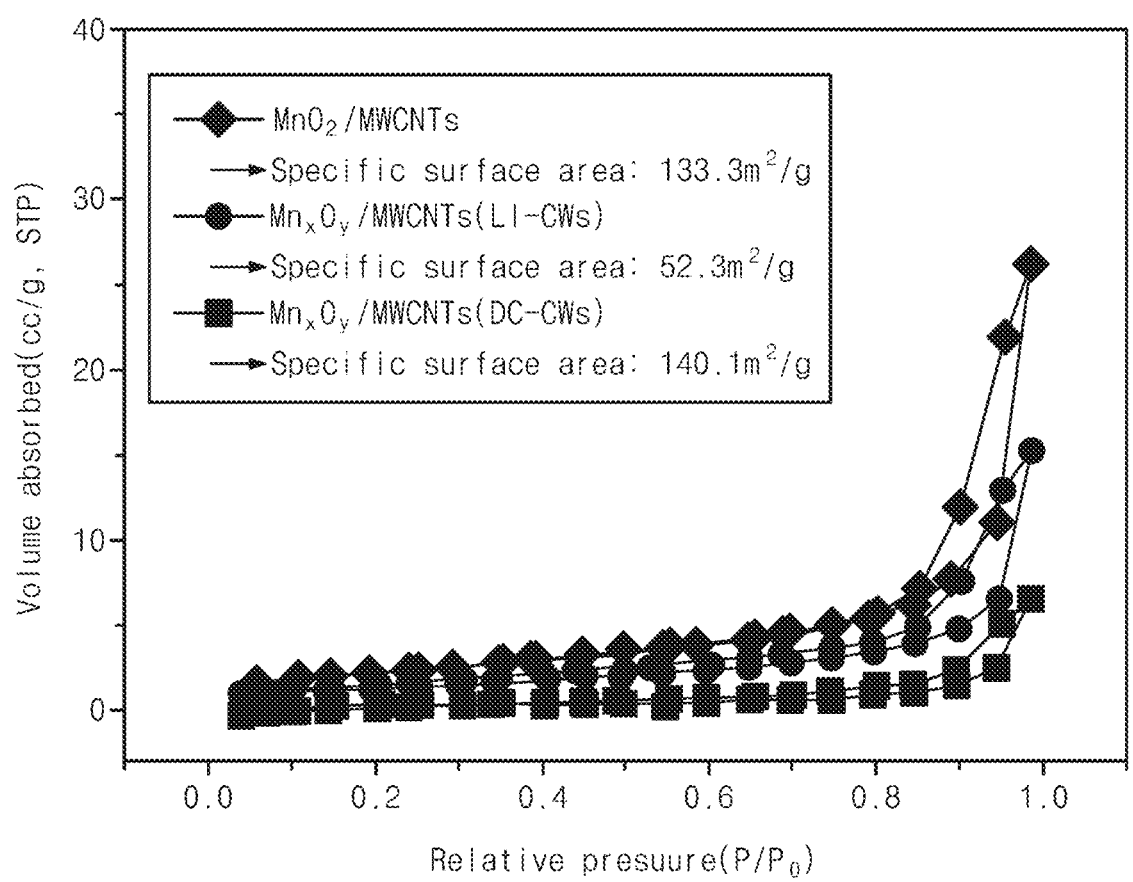
FIG. 5 illustrates Brunauer-Emmett-Teller (BET) specific surface areas of a metal oxide film according to another example embodiment of the present disclosure.

FIG. 5 illustrates Brunauer-Emmett-Teller (BET) specific surface areas of a metal oxide film according to another example embodiment of the present disclosure.

Referring to FIG. 5, specific surface areas characterized by Brunauer-Emmett-Teller (BET) analysis confirm that an aggregation structure of $Mn_xO_y$/MWCNT applied with DC field-driven combustion waves is less aggregated. The $Mn_xO_y$/MWCNT produced by the DC field-driven combustion waves exhibits a maximum surface area (less than 140.1 m$^2$/g). A surface area of $MnO_2$/MWCNT produced without exposure to a high temperature is 133.3 m$^2$/g. $Mn_xO_y$/MWCNT produced by laser irradiation-driven combustion waves exhibited a lowest surface area (less than 52.3 m$^2$/g). This difference is interpreted to result from rapid propagation of the DC field-driven combustion waves to prevent aggregation of nanoparticles under high-temperature conditions.

Returning to FIGS. 4G and 4H, abnormal growth of nanorod-shaped manganese oxide is observed in the manganese oxide-MWCNT hybrid. A feature of the synthesis condition established by DC field-driven combustion waves is to form a strong electric field across percolation networks of an MWCNT. The MWCNT has electrical conductivity high enough to effectively transfer thermal energy as well as charge carriers. Random networks of the MWCNT may contribute to distribute DC fields to $MnO_2$ nanoparticles in contact with the MWCNT. In general, a manganese oxide nanorod may be synthesized using an arc discharge method. When a strong DC field is distributed above a laminate structure, the MWCNT and $MnO_2$ may act as a cathode and an anode, respectively, and arc discharge conditions may be established by the DC field-driven combustion waves. That is, when a DC field is applied to the hybrid structure, arc discharge may occur in a gap between the MWCNT and the $MnO_2$ nanoparticles. On the other hand, a high temperature and a high pressure may promote crystal growth to produce a nanorod while the porous fuel membrane is burning. The manganese oxide nanorod may have a large aspect ratio and may provide another charge transfer path a large surface area. Accordingly, the growth of the nanorod may increase capacitance in a pseudo-capacitive behavior.

FIGS. 6A-6D are SEM images depending on a DC-field applied to fabricate a $MnO_2$/MWCNT hybrid nanostructure according to another example embodiment of the present disclosure.

An optimal DC field for growth of a manganese oxide nanorod was investigated by variation in voltage and current. For a test area of 1×1 cm², an MWCNT layer having a layered structure has low electrical resistance of 5 ohms (Ω) to 10Ω.

Figure 6A:
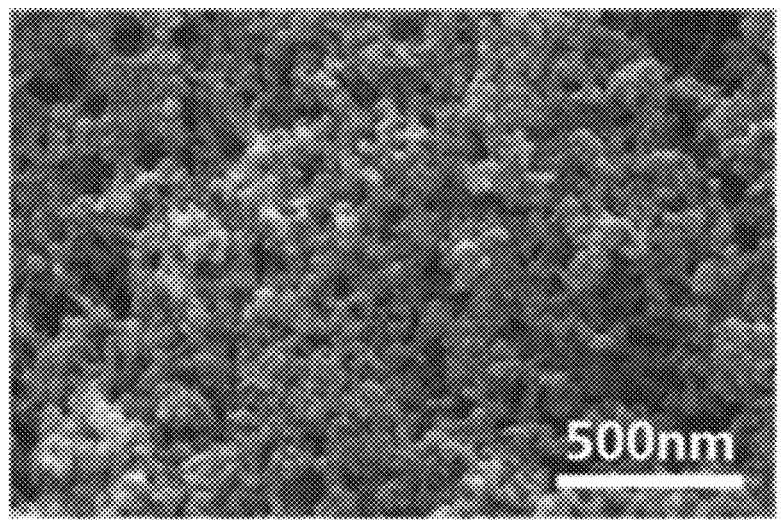
FIG. 6A is SEM images illustrating $MnO_2$/MWCNT produced without applying a DC field exhibits morphological and structural characteristics.

Referring to FIG. 6A, $MnO_2$/MWCNT produced without applying a DC field exhibits morphological and structural characteristics.

Figure 6B:
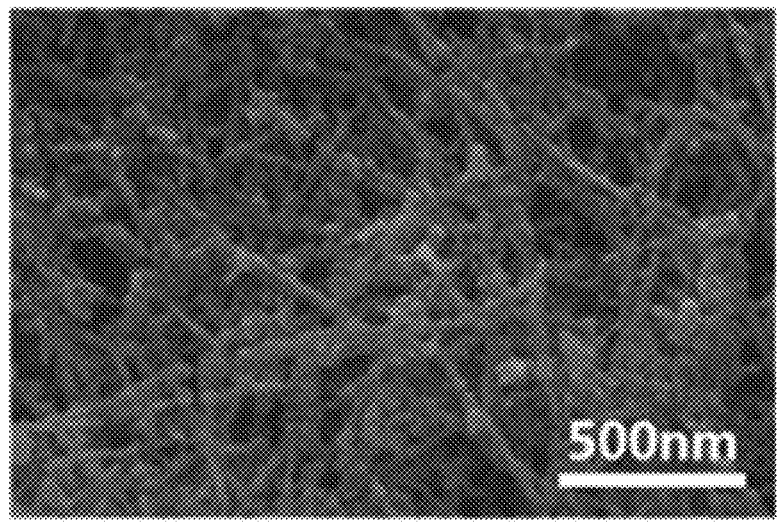
FIG. 6B is SEM images illustrating $MnO_2$/MWCNT produced with a DC field of 20 V and 0.75 A.

Referring to FIG. 6B, when a DC field of 20 V and 0.75 A was applied to a $MnO_2$/MWCNT layered structure during combustion, a slight change in shape of an internal structure including nanoparticles and nanorods was observed.

Figure 6C:
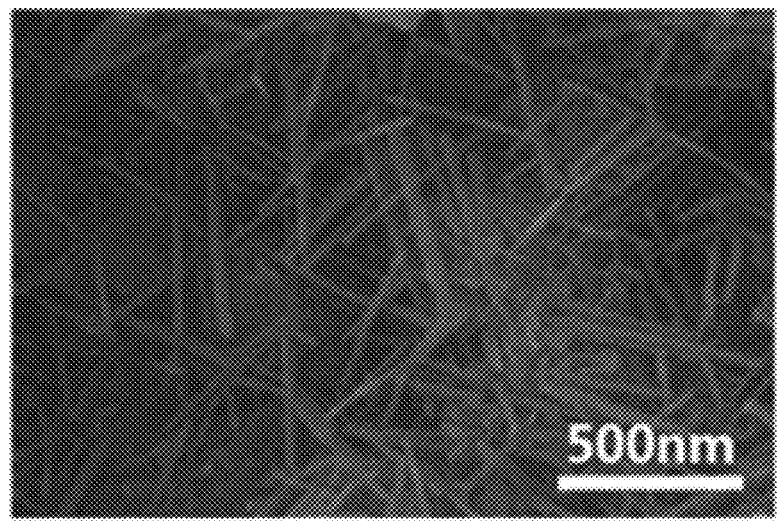
FIG. 6C is SEM images illustrating $MnO_2$/MWCNT produced with a DC field of 30 V and 1 A.

Referring to FIG. 6C, when a DC field of 30 V and 1 A was applied, growth of a manganese oxide nanorod was significantly improved. Thus, an appropriate application of the DC field establishes physical conditions suitable for arc discharge between an MWCNT and a manganese oxide.

Figure 6D:
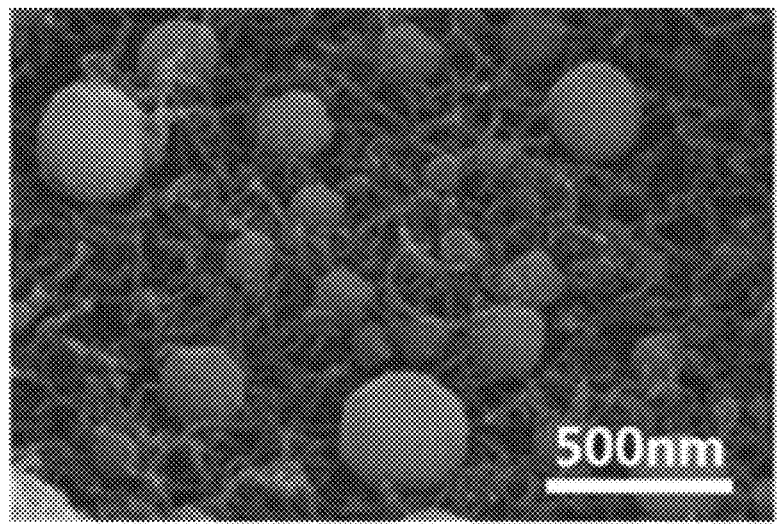
FIG. 6D is SEM images illustrating $MnO_2$/MWCNT produced with a DC field of 150 V and 1 A.

Referring to FIG. 6D, when a DC field increased to 150 V and 1 A, manganese oxide particles aggregated in a hybrid structure were observed. A strong DC field may provide too much thermal energy to cause critical aggregation of $MnO_2$ nanoparticles.

When an intermediate DC field between 30 V and 150 V is applied to the $MnO_2$/MWCNT layered structure, coexistence of the nanorod and aggregated particles is observed after the DC field-driven combustion waves is applied.

Figure 7:
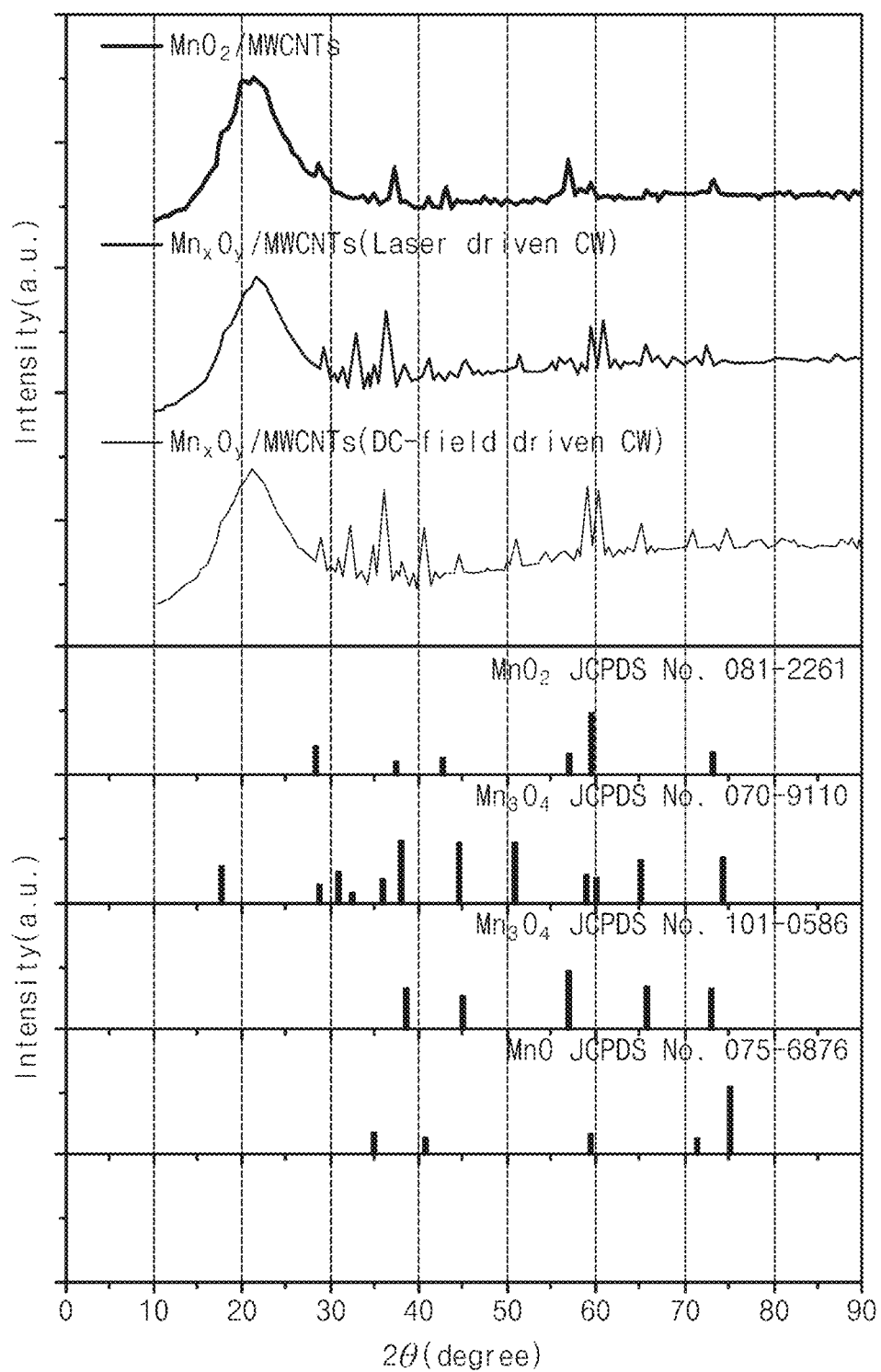
FIG. 7 illustrates results of an X-ray diffraction (XRD) pattern showing a change in physiochemical composition of a hybrid induced by a combustion wave in a metal oxide film according to another example embodiment of the present disclosure.

FIG. 7 illustrates results of an X-ray diffraction (XRD) pattern showing a change in physiochemical composition of a hybrid induced by a combustion wave in a metal oxide film according to another example embodiment of the present disclosure.

Referring to FIG. 7, XRD data clearly shows reduction of $MnO_2$ nanoparticles. An XRD profile of $MnO_2$/MWCNT layered structure before application of combustion waves showed a peak corresponding to a tetragonal crystal structure of $MnO_2$ (JCPDS No. 081-2261). However, a profile of the $MnO_2$/MWCNT hybrid applied with laser irradiation-driven combustion waves or DC field-driven combustion waves showed the presence of manganese oxides having different oxidation states and including $MnO_2$, $Mn_2O_3$, $Mn_3O_4$, and MnO. A diffraction peak of $Mn_3O_4$ corresponds to a tetragonal structure (JCPDS No. 070-9110, hausmannite) belonging to the $I4^1/amd$ space group having unit grating parameters in which a=5.76 Å, c=9.46 Å, and Z=4. On the other hand, $Mn_3O_4$ belongs to a dark brown spinel group. A diffraction peak of MnO corresponds to a hexagonal cubic structure (JCPDS No. 075-6876, manganosite) belonging to the Fm3m space group having unit lattice parameters in which a=4.44 Å and Z=4. A diffraction peak of $Mn_2O_3$ corresponds to a cubic structure belonging to the Ia-3 space (JCPDS No. 101-0586, manganese (III) oxide). This analysis shows that application of laser irradiation-driven combustion waves or DC field-driven combustion waves may reduce a manganese oxide to a heterostructure of $MnO_2/Mn_2O_3/Mn_3O_4$/MnO within one second due to consumption of oxygen radicals in a metal oxide.

Figure 8:
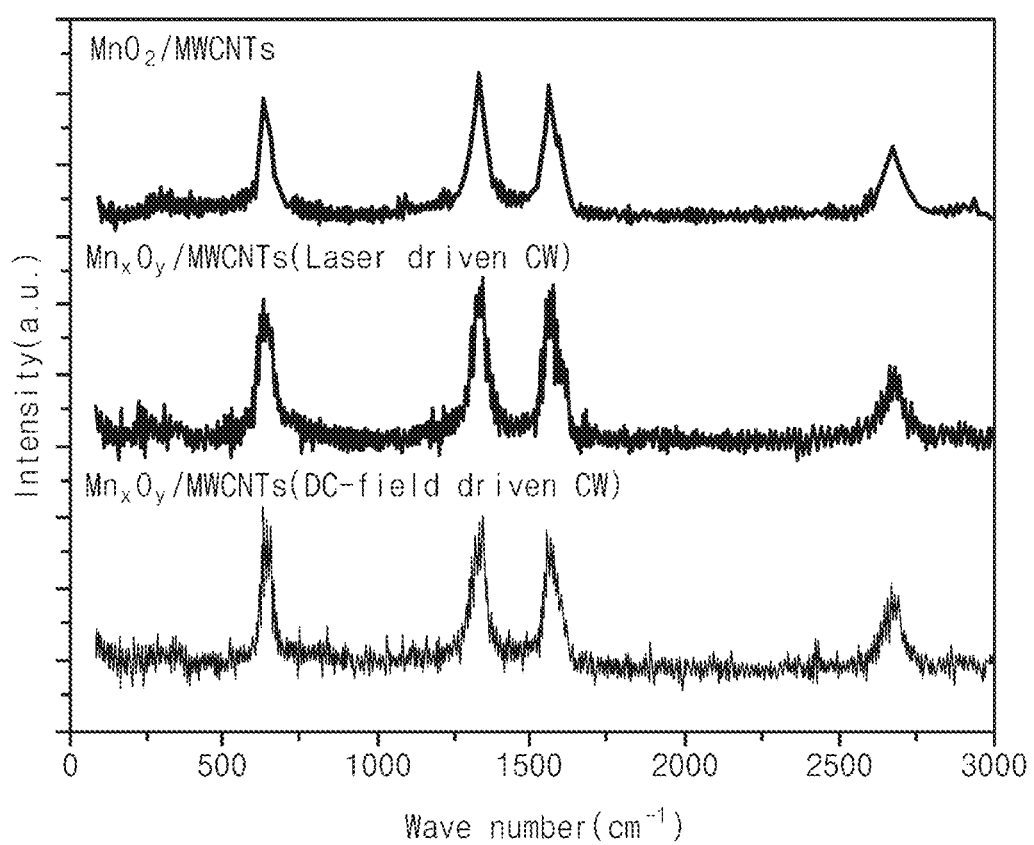
FIG. 8 illustrates analysis results of a Raman spectrum in a metal oxide film according to another example embodiment of the present disclosure.

FIG. 8 illustrates analysis results of a Raman spectrum in a metal oxide film according to another example embodiment of the present disclosure.

Referring to FIG. 8, changes of an MWCNT induced by combustion waves were investigated by Raman spectroscopy. In general, Raman spectrum did not significantly change D and G peaks (1330 and 1576 $cm^{-1}$) or a peak at 2650 $cm^{-1}$ associated with defects of the MWCNT. A unit peak of manganese oxide is not substantially changed. This result demonstrates that laser irradiation-driven combustion waves or DC field-driven combustion waves do not cause a physicochemical change of the MWCNT although a layered porous fuel membrane is in direct contact with the MWCNT. This may be because a contact time between the MWCNT and the combustion waves is very short. Although the combustion waves propagate along a laminated structure within one second, a high temperature region which may cause oxidation of the MWCNT is temporarily formed only in reaction front of the combustion waves. A short period of time for direct contact with the combustion waves may not be sufficient to damage the entire MWCNT. Accordingly, an MWCNT layer is intrinsically preserved before and after exposure to the laser irradiation-driven combustion waves or the DC field-driven combustion waves.

Reduction states of the manganese oxide before and after application of the combustion waves were investigated by obtaining Mn2p and O1s XPS spectra.

FIGS. 9A~9F illustrates analysis results of X-ray photoelectron spectroscopy (XPS) in a metal oxide film according to another example embodiment of the present disclosure.

Figure 9A:
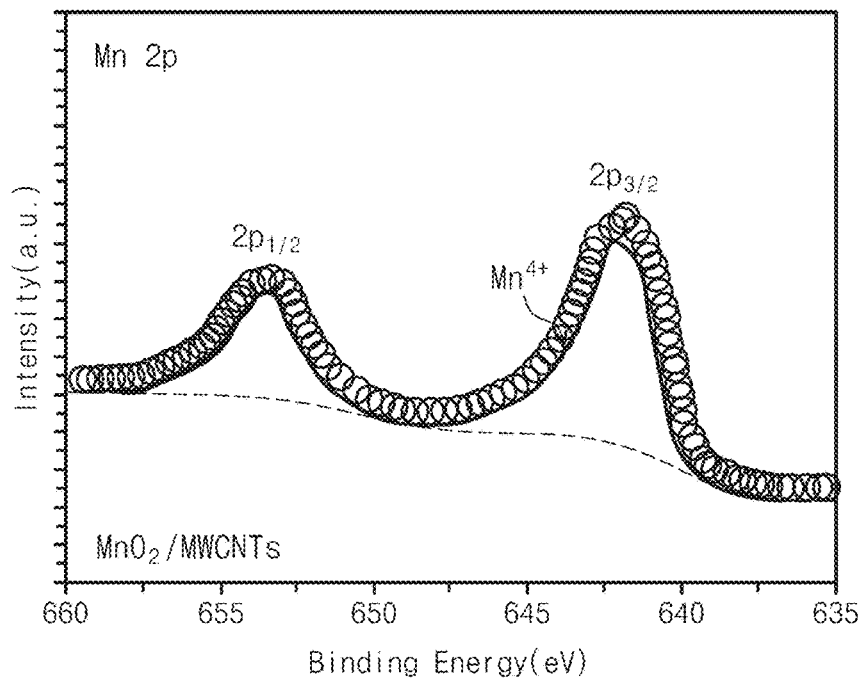
FIGS. 9A and 9B illustrate analysis results of X-ray photoelectron spectroscopy (XPS) in $MnO_2$/MWCNTs before application the combustion waves according to another example embodiment of the present disclosure.
Figure 9B:
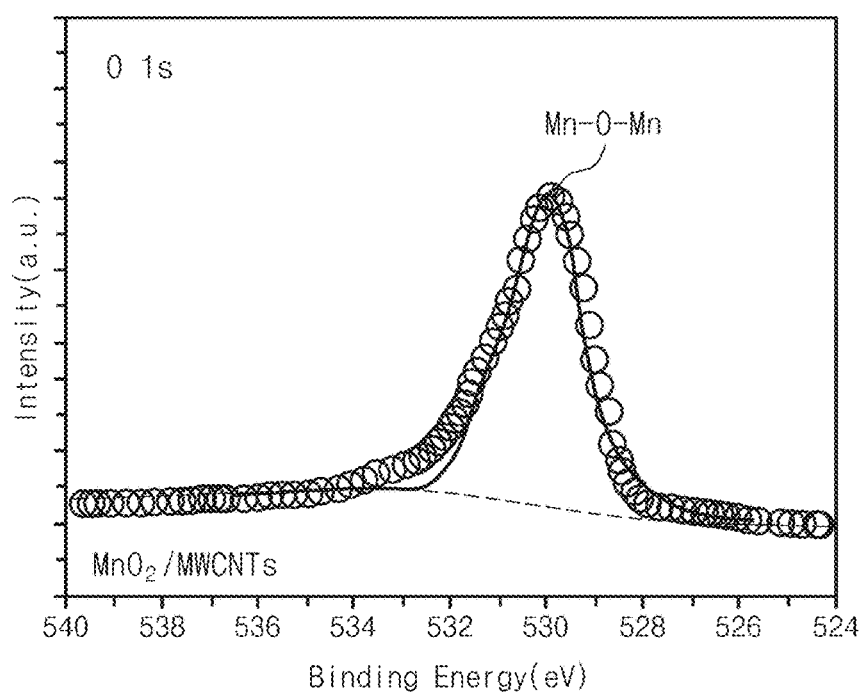

Referring to FIGS. 9A and 9B, accurate chemical compositions of heterostructures having different oxidation states were analyzed. An XPS profile of the $MnO_2$/MWCNT laminated structure before application of the combustion waves shows a 2p1/2 peak at 642.8 eV and $Mn_4+$ from $MnO_2$ nanoparticles in Mn 2P spectrum. On the other hand, 1S spectrum of O shows an O—Mn—O peak at 529.7 eV.

Figure 9C:
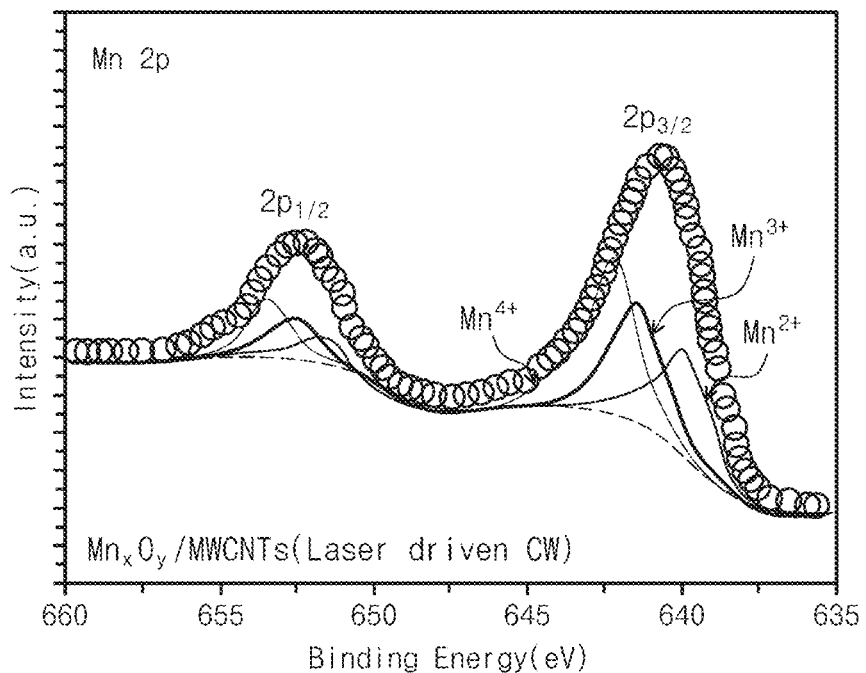
FIGS. 9C and 9D illustrate analysis results of X-ray photoelectron spectroscopy (XPS) in $Mn_xO_y$/MWCNTs after application the laser-irradiation-driven combustion waves according to another example embodiment of the present disclosure.
Figure 9D:
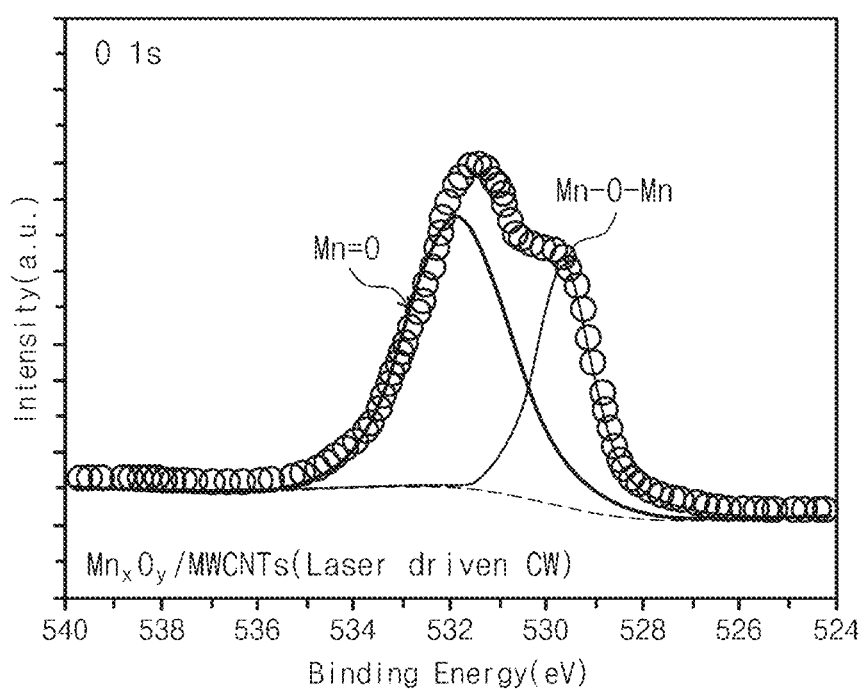
Figure 9E:
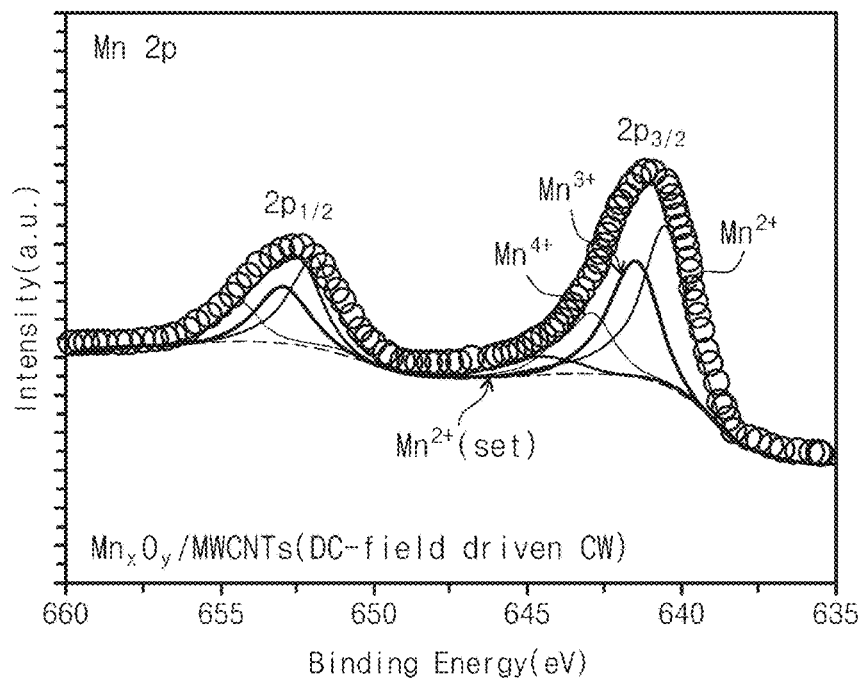
FIGS. 9E and 9F illustrate analysis results of X-ray photoelectron spectroscopy (XPS) in $Mn_xO_y$/MWCNTs after application the DC field-driven combustion waves according to another example embodiment of the present disclosure.
Figure 9F:
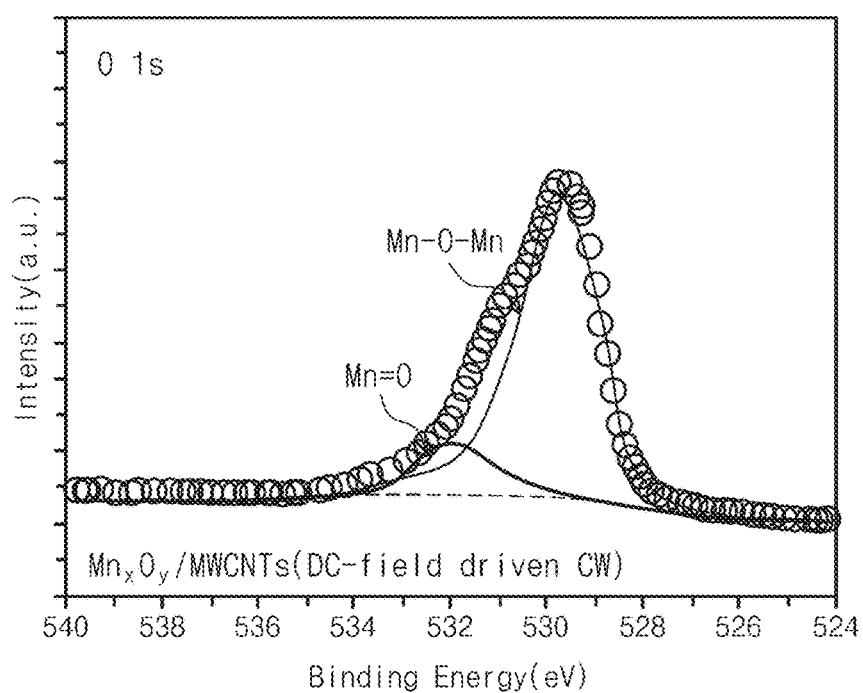

Referring to FIGS. 9C and 9D, when the laser irradiation-driven combustion waves or the DC field-driven combustion waves are applied to a $MnO_2$/MWCNT laminated structure, the Mn 2P spectrum shows a plurality of peaks in a state of $2p_{1/2}$ at 640.7, 641.8, 642.8, and 645.0 eV corresponding to the satellite peaks of $Mn^{2+}$, $Mn^{3+}$, $Mn^{4+}$, and $Mn^{2+}$, respectively. In addition, O1s spectrum showed two specific peaks at 529.7 eV and 532 eV corresponding to O—Mn—O and O=Mn.

Moreover, a hybrid structure fabricated by the laser irradiation-driven combustion waves exhibits three peaks in a state of $2p_{1/2}$ at 640.7, 641.8 and 642.8 eV. Distinct ratios of three types of ion are 23.7, 31.9, and 44.4 for $Mn^{2+}$, $Mn^{3+}$, and $Mn^{4+}$, respectively Referring to FIGS. 9E and 9F, meanwhile, a hybrid structures fabricated by the DC field-driven combustion waves shows four peaks in a state of $2p_{1/2}$ at 640.7, 641.8, 642.8, and 645.0 eV. Distinct ratios of three types of ion are 44.8, 32.5, and 22.7 for $Mn^{2+}$, $Mn^{3+}$, and A ratio of reduced states in the laser irradiation-driven combustion waves and the DC field-driven combustion waves is 1.7, 82.35, 15.95 and 33.45, 50.3 16.25 for MnO, $Mn_3O_4$, and $Mn_2O_3$, respectively.

It will be assumed that each phase includes a specific ion, in detail, one $Mn^{2+}$ ion for MnO, two $Mn^{2+}$ ions for $Mn_2O_3$, one Me ion for $Mn_2O_3$, and two $Mn^{3+}$ ions for $Mn_2O_3$. This result shows that an amplified reaction in DC field-driven combustion waves may provide more oxygen deficiency and produce more reduced manganese oxide in a multiple oxidation state.

Additionally, optimization of the DC field-driven combustion waves may appropriately modulate a molar ratio between $Mn_2O_3$, $Mn_3O_4$, and MnO. Strong combustion waves may allow a ratio of MnO to be increased, whereas weakened combustion waves may allow a ratio of $Mn_2O_3$ and $Mn_3O_4$ to be increased.

The DC field-driven combustion waves may provide various flame sources through many conditions such as a design of a laminated structure of a fuel and a target material, the total amount of the fuel, and an absolute magnitude of an applied voltage.

Electrochemical Performance of $Mn_xO_y$/MWCNT-Based Supercapacitor Electrode Fabricated by Applying Laser Irradiation-Driven Combustion Waves and DC Field-Driven Combustion Waves An electrochemical measurement was performed to evaluate performance of a $Mn_xO_y$/MWCNT-based supercapacitor electrode before and after application of combustion waves. In a triple-electrode system, $Mn_xO_y$ and MWCNT act as active materials (current collectors). A $Na_2SO_4$ solution (1M), Ag/AgCl, and a platinum (Pt) wire were used as an electrolyte, a reference electrode, and a counter electrode, respectively. Cyclic voltammograms (CV) of the three different electrodes (the $MnO_2$/MWCNT electrode, the $Mn_xO_y$/MWCNT-based electrode fabricated by applying laser irradiation-driven combustion waves, and the $Mn_xO_y$/MWCNT-based electrodes fabricated by applying DC field-actuated combustion waves) are obtained at various scanning rates.

Figure 10A:
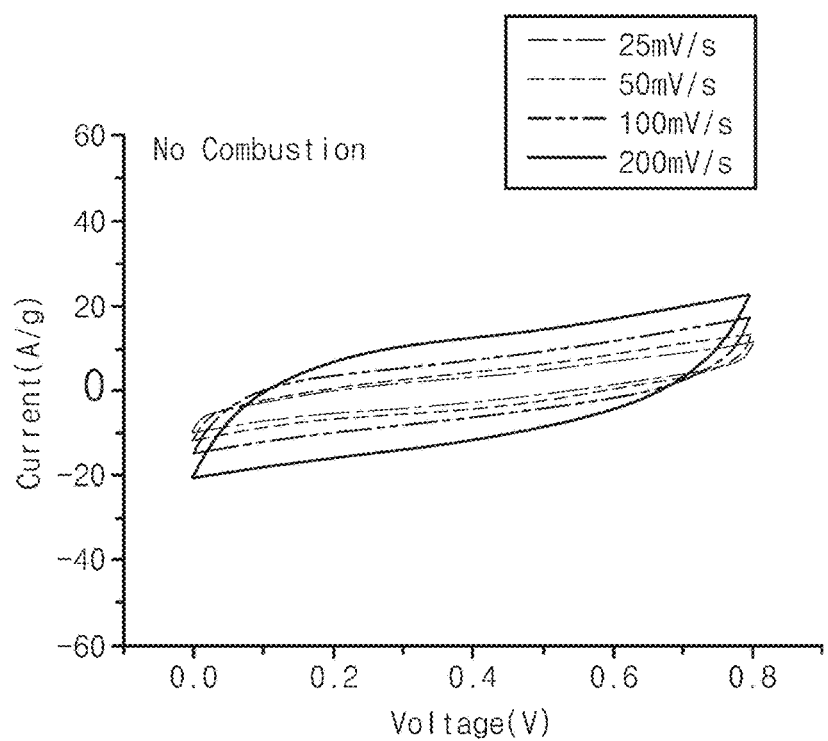
FIG. 10A illustrates results of cyclic voltammograms (CV) of an electrode with no combustion.
Figure 10B:
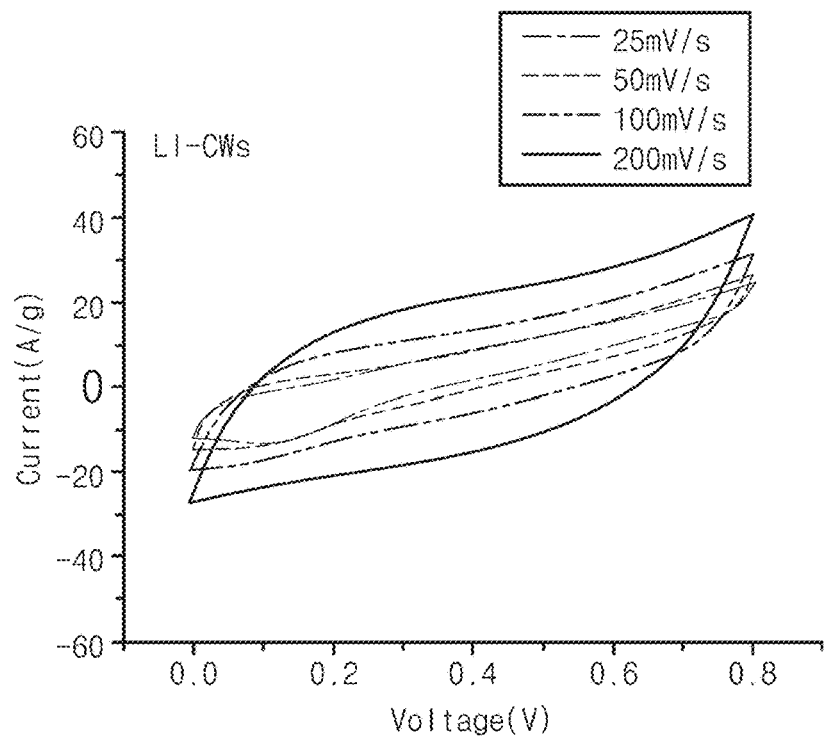
FIG. 10B illustrates results of cyclic voltammograms (CV) of an electrode produced by laser-irradiation-driven combustion waves.
Figure 10C:
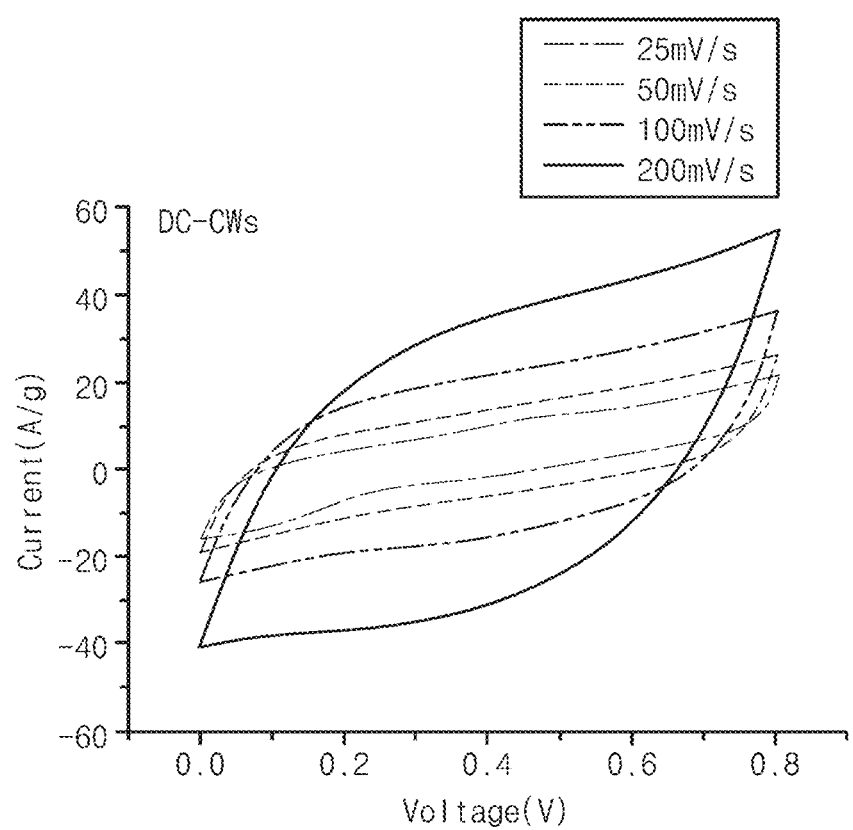
FIG. 10C illustrates results of cyclic voltammograms (CV) of an electrode produced by DC field-driven combustion waves.

FIGS. 10A~10C illustrate results of cyclic voltammograms (CV) showing electrochemical characteristics of supercapacitor electrodes according to another example embodiment of the present disclosure.

Referring to FIGS. 10A, 10B, and 10C, the cyclic voltammograms (CV) for three electrodes are shown. To compare the three electrodes, the total mass of an active material for all electrodes was fixed to 20 mg (5 mg of $Mn_xO_y$ and 15 mg of MWCNT). A CV curve of the MWCNT is much smaller than a CV curve of $MnO_2$. In general, an MWCNT having chemical stability is used in a capacitor electrode based on the principle of EDLC classified as pseudo-capacitance that may be formed from a redox reaction of an electrode. In the case of EDLC, energy is stored based on electrostatic force between two electrodes without the redox reaction, and capacitance is smaller than capacitance of a pseudo-capacitor. Accordingly, the MWCNT is used as a current collector for the supercapacitor electrode. Capacitance of the MWCNT is subtracted from measured specific capacitance of the $Mn_xO_y$/MWCNT-based electrode.

At all scanning rates, the $Mn_xO_y$/MWCNT-based electrode fabricated by applying DC field-driven combustion waves exhibits highest specific capacitance. However, the $Mn_xO_y$/MWCNT-based electrode fabricated by applying laser irradiation-driven combustion waves exhibits capacitance higher than capacitance of the $MnO_2$/MWCNT electrodes. As the scanning rate increases, a current per unit area of all the electrodes is increased to exhibit an ideal behavior of an electrochemical capacitor, as observed from a symmetrical rectangular shape of the CV.

Figure 11A:
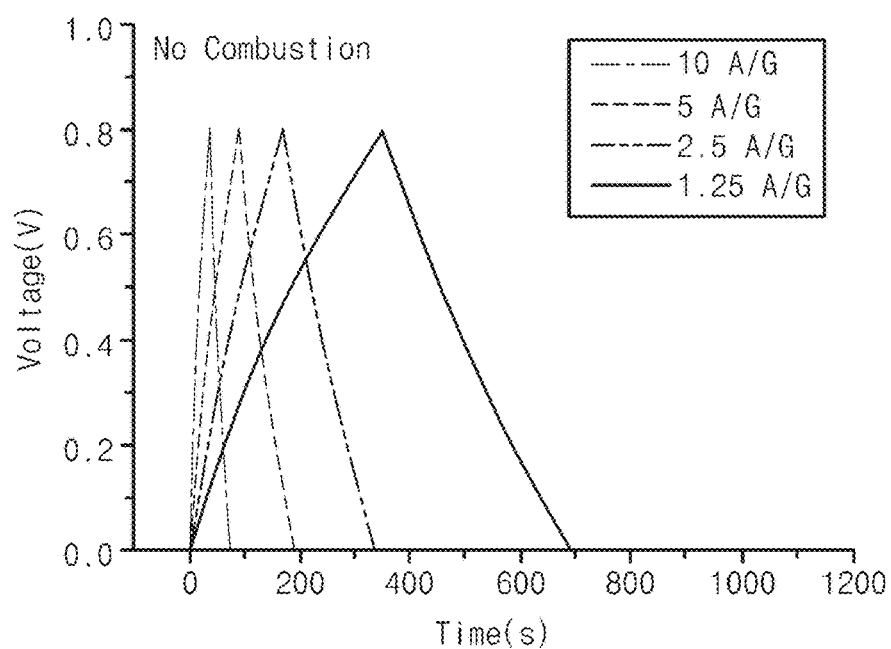
FIG. 11A illustrates results of galvanostatic charge-discharge characteristics showing electrochemical characteristics of supercapacitor electrodes for the $MnO_2$/MWCNT electrode.
Figure 11B:
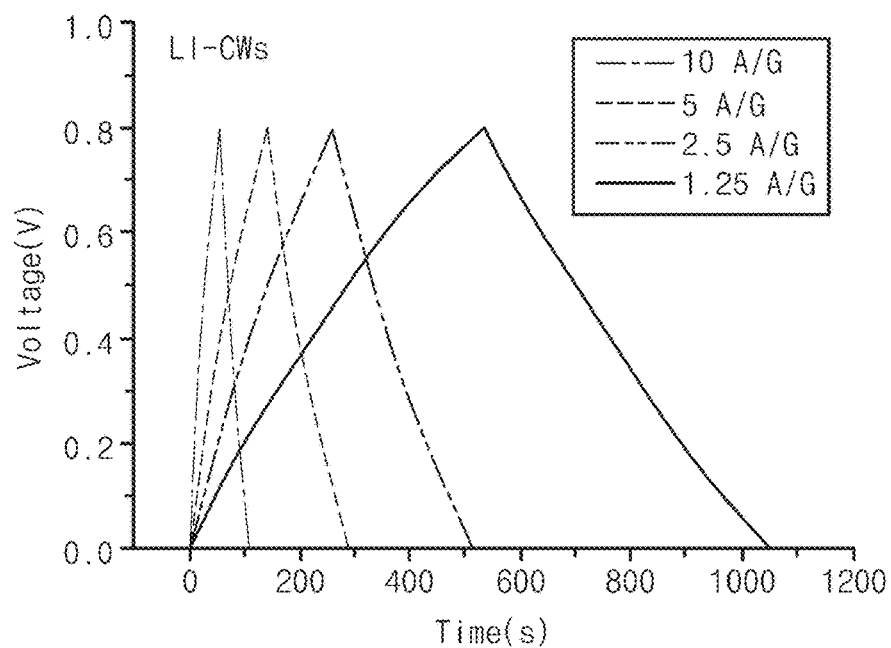
FIG. 11B illustrates results of galvanostatic charge-discharge characteristics showing electrochemical characteristics of supercapacitor electrodes for the $Mn_xO_y$/MWCNT-based electrode fabricated by applying laser irradiation-driven combustion waves.
Figure 11C:
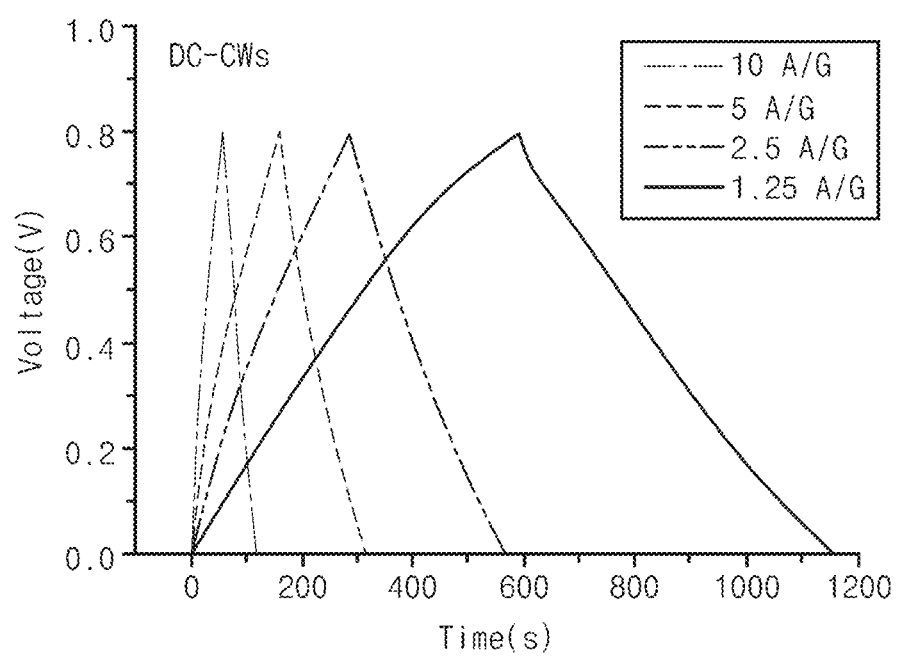
FIG. 11C illustrates results of galvanostatic charge-discharge characteristics showing electrochemical characteristics of supercapacitor electrodes for the $Mn_xO_y$/MWCNT-based electrodes fabricated by applying DC field-actuated combustion waves.

FIGS. 11A~11C illustrate results of galvanostatic charge-discharge characteristics showing electrochemical characteristics of supercapacitor electrodes according to another example embodiment of the present disclosure.

FIGS. 11A, 11B, and 11C, galvanostatic charge-discharge curves for the three different electrodes (the $MnO_2$/MWCNT electrode, the $Mn_xO_y$/MWCNT-based electrode fabricated by applying laser irradiation-driven combustion waves, and the $Mn_xO_y$/MWCNT-based electrodes fabricated by applying DC field-actuated combustion waves) are shown. The galvanostatic charge-discharge curves are measured at current densities of 1.25, 2.5, 5, and 10 A/g within a voltage range of 0 volt to 0.8 volt.

All the charge-discharge curves denote ideal bilateral symmetrical shapes at a highest charge voltage point, resulting in a slight decrease in internal resistance. The charge-discharge curves had linear energy quantity slopes for charge-discharge intervals. This result shows that the electrical conductivity of the electrode is adequate and energy loss caused by internal resistance is not significant. Additionally, similar charge and discharge durations denote stable polarization efficiency.

Figure 12A:
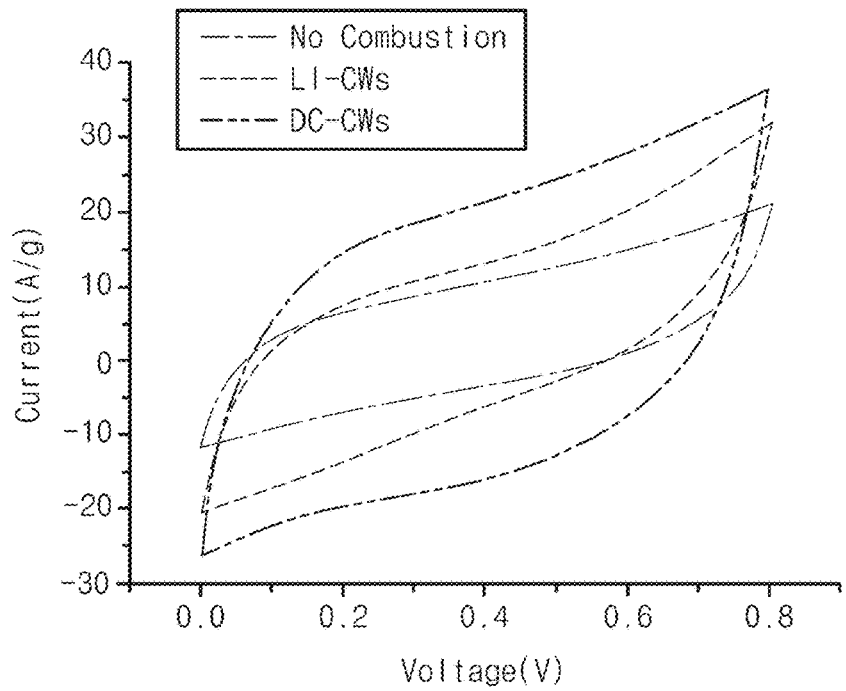
FIG. 12A illustrates results showing electrochemical characteristics of supercapacitor electrodes.
Figure 12B:
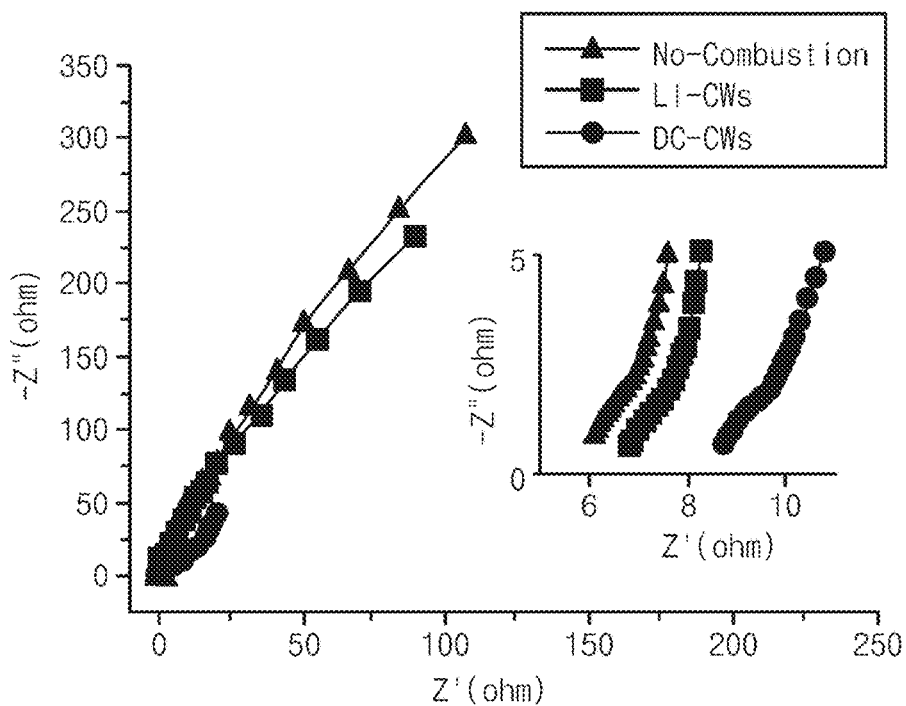
FIG. 12B illustrates results showing electrochemical impedance spectroscopy (EIS) of supercapacitor electrodes.
Figure 12C:
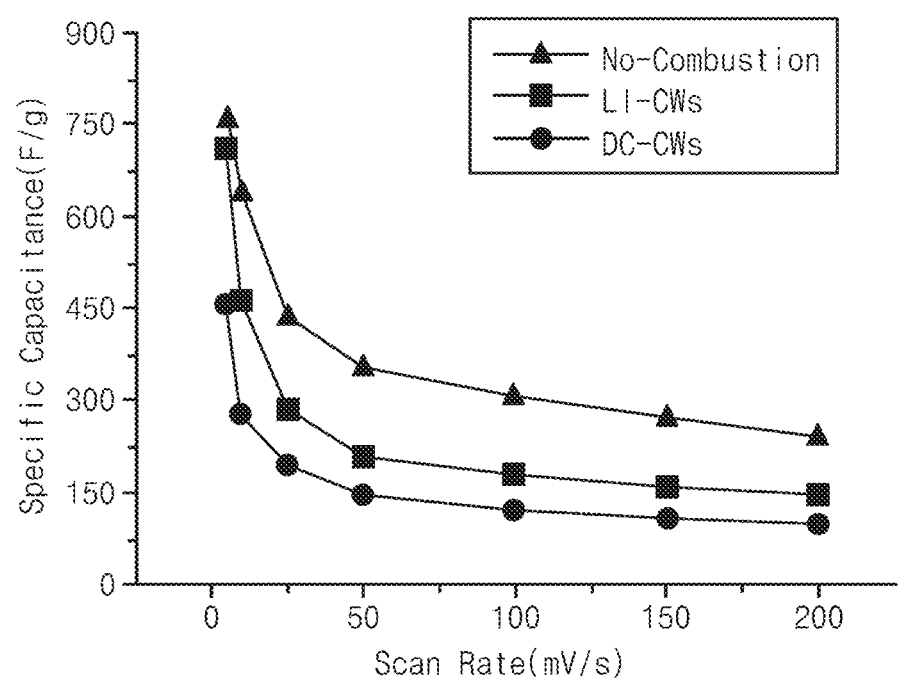
FIG. 12C illustrates results showing specific capacitances of supercapacitor electrodes.

FIGS. 12A~12C illustrate results showing electrochemical characteristics of supercapacitor electrodes according to another example embodiment of the present disclosure.

Referring to FIG. 12A, representative characteristics of CV curves of three electrodes are compared at a scanning rate of 100 mV/s. Compared with the MWCNT electrode, the $Mn_xO_y$/MWCNTs hybrid has high capacitance. In particular, the $Mn_xO_y$/MWCNT-based electrode fabricated by applying DC field-drive combustion waves exhibit most excellent performance. However, the $MnO_2$/MWCNT-based electrode which does not use combustion waves exhibits low performance. In a supercapacitor electrode using a metal oxide, capacitance is significantly dependent on a shape and a surface area of an active material because charges generated in a redox reaction of the metal oxide migrate through the electrode. With regard to porous structure and morphology, a $Mn_xO_y$ nanostructure exposed to combustion may induce higher capacitance through a substantial contact area of an anode and an electrolyte to induce more redox reactions between ions and the metal oxide than the $MnO_2$ nanoparticles.

Referring to FIG. 12B, results of electrochemical impedance spectroscopy (EIS) are shown. The electrochemical impedance spectroscopy provides information on internal resistances associated with electrical conductivity in three different electrodes.

The higher electrical conductivity, the lower equivalent serial resistance (ESR). The equivalent series resistances calculated for the area of 1 $cm^2$ for the $MnO_2$/MWCNT-based and $Mn_xO_y$/MWCNT-based electrodes fabricated respectively by laser irradiation-driven combustion waves and DC field-driven combustion waves are 8.76, 6.85 and 6.03 ohms ($\Omega$), respectively. High electrical conductivity of tangled networks of the MWCNT provides an efficient path for charge transport and reduces internal resistance. However, a detailed difference in electrochemical impedance spectroscopy depending on inter-networks of a micro-nanostructure has a significant effect on overall performance of the supercapacitor electrode.

In particular, a slope of a curve denoting a frequency response of an electrode was greatest in the $Mn_xO_y$/MWCNT-based electrodes fabricated by applying DC field-driven combustion waves. This result lead to the fastest charge transport in the system through redox reactions inside the electrode, and the fast charge transport contributes to improved electrochemical performance.

In addition, manganese oxides having different valence states may promote a heterojunction effect between $Mn_2O_3$, $Mn_3O_4$, and MnO. Various chemical valence states of manganese, derived from differently reduced states via DC field-driven combustion waves, may form a nanoscale heterostructure and set an electrical field between boundaries to improve electrical conductivity. A substantial contact nanostructure of $Mn_xO_y$ and MWCNT induced by combustion waves may promote charge transfer from a metal oxide to the MWCNT.

Referring to FIG. 12C, specific capacitances at various scanning rates of 5, 25, 50, 100, 150, and 200 mV/s are shown. All the capacitances are in inverse proportion to the scanning rate at the supercapacitor electrode. Maximum specific capacitances for all the electrodes are obtained at a lowest scanning rate of 5 mV/s. At this scan rate, the specific capacitances of $Mn_xO_y$/MWCNT-based electrodes using DC field-driven combustion waves are 757 F/g. A $Mn_xO_y$/MW- CNT-based electrode fabricated by applying laser irradiation-driven combustion waves exhibits specific capacitances of 707 F/g. The $MnO_2$/MWCNT-based electrode exhibits specific capacitances of 463 F/g.

Capacitance of electrodes fabricated by applying laser-driven combustion waves and DC field-driven combustion waves are 163% and 152% greater than capacitance of an electrode prepared without combustion. Moreover, a $Mn_xO_y$/MWCNT-based electrode fabricated by applying DC field-driven combustion waves exhibits a low drop rate of specific capacitance with an increase in the scanning rate (5 to 200 mV/s, drop rate being 68%). The $Mn_xO_y$/MWCNT-based electrode fabricated by applying laser irradiation-driven combustion waves exhibit a drop rate of 80%. In addition, the $MnO_2$/MWCNT-based electrode exhibits a drop rate of 79%.

After a laser irradiation-driven combustion wave process, an original shape of the $Mn_xO_y$ nanoparticle remains suitable while a dimension and a morphology thereof are significantly changed. High thermal energy, lasting for a few seconds, may melt the $MnO_2$ nanoparticles to convert the melted $MnO_2$ nanoparticles into $Mn_xO_y$ in various oxidation states. Some of the melted $MnO_2$ nanoparticles penetrate pores of the MWCNT network. Thus, the physical bonding between a manganese oxide and an MWCNT may be improved.

Returning to FIG. 7, $Mn_xO_y$ synthesized using laser irradiation-driven combustion waves has a hexoctahedral crystalline form with strong binding force and may contribute to improved electrochemical performance.

On the other hand, $Mn_xO_y$/MWCNT fabricated by applying DC field-driven combustion waves undergoes high-temperature conditions for a shorter time besides an electric field applied across the entire area of a $Mn_xO_y$/MWCNT layered structure. Due to arc discharge caused by the electric field of the $MnO_2$ nanoparticles and the MWCNT, a heterogeneous nanostructure of $Mn_xO_y$ nanorods and nanoparticles is synthesized and extremely short duration suppresses aggregation of the nanostructures.

A large surface area, absence of aggregation, and enhanced conductivity derived from a nanorod are main factors contributing to better performance of the fabricated electrodes. Additionally, solid contact of internal nanostructures may induce improved transfer of electrons generated in a redox reaction between a supercapacitor electrode and an electrolyte.

FIGS. 13A~13D illustrate results showing stability of a supercapacitor according to another example embodiment of the present disclosure.

Figure 13A:
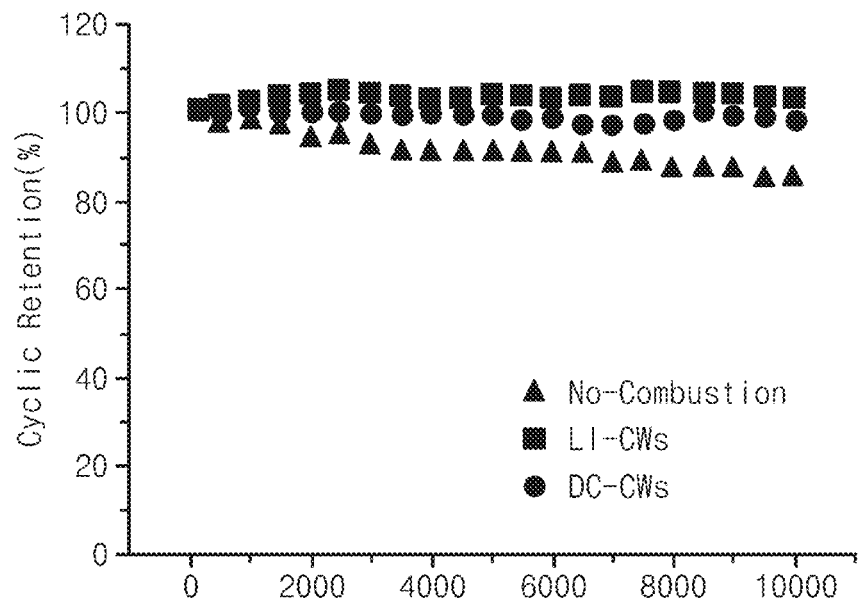
FIG. 13A illustrates results showing long-term charge-discharge cycle performance.

Referring to FIG. 13A, long-term charge-discharge cycle performance for three different electrodes is shown. Charge-discharge performance for three electrodes (a $MnO_2$/MWCNT electrode, a $MnO_2$/MWCNT electrode fabricated by applying laser irradiation-driven combustion waves, and a MnxOy/MWCNT electrode fabricated by applying DC field-driven combustion waves) were compared for a long period of time. As a result of the comparison, an electrode exposed to the combustion wave exhibited improved stability.

The cycle performance was evaluated in a range of 0 volt to 0.8 volt at a scanning rate of 100 mV/s during 10,000 cycles. The $MnO_2$/MWCNT electrode inevitably exhibits a 20% decrease in specific capacitance over 10,000 cycles.

However, capacitance retentions of $Mn_xO_y$/MWCNT-based electrodes fabricated by applying laser irradiation-driven combustion waves and DC field-driven combustion waves is maintained at 103% and 100%, respectively.

First and last cycles of the $Mn_xO_y$/MWCNT-based electrode are compared with each other. Both curves exhibit nearly the same rectangular shape. The comparison result confirms that capacitances of electrodes exposed to combustion are substantially stable over 10,000 cycles. In the early stage of the cycling test, I-V curve moves slightly, which may occur from a stabilization process of a supercapacitor electrode. For example, the electrolyte may penetrate pores of an electrode in the early stage of a cycle. From the viewpoint of structural transition, weakly agglomerated $Mn_xO_y$ nanostructures may be separated from each other during the charge-discharge cycle.

DC field-driven combustion waves form a substantial hybrid structure of $Mn_xO_y$ and MWCNT due to a high temperature from a preheating effect. On the other hand, a $Mn_xO_y$/MWCNT-based electrode fabricated by applying laser irradiation-driven combustion wave exhibits large and unstable capacitance at an initial stage. After the stabilization cycle, the $Mn_xO_y$/MWCNT-based electrode fabricated by applying the laser irradiation-driven combustion waves and the DC field-driven combustion waves did not exhibit degradation associated with electrochemical performance in the cycling test, unlike the $MnO_2$/MWCNT-based electrode. Since the combustion waves pass through the $Mn_xO_y$/MWCNT hybrid under high-temperature conditions, the entire electrode is already exposed to an extreme environment to improve durability against thermochemical/electrical degradation during the charge-discharge cycle. As a result, the laser irradiation-driven combustion waves and the DC field-driven combustion waves significantly improve the capacitance retention.

Figure 13B:
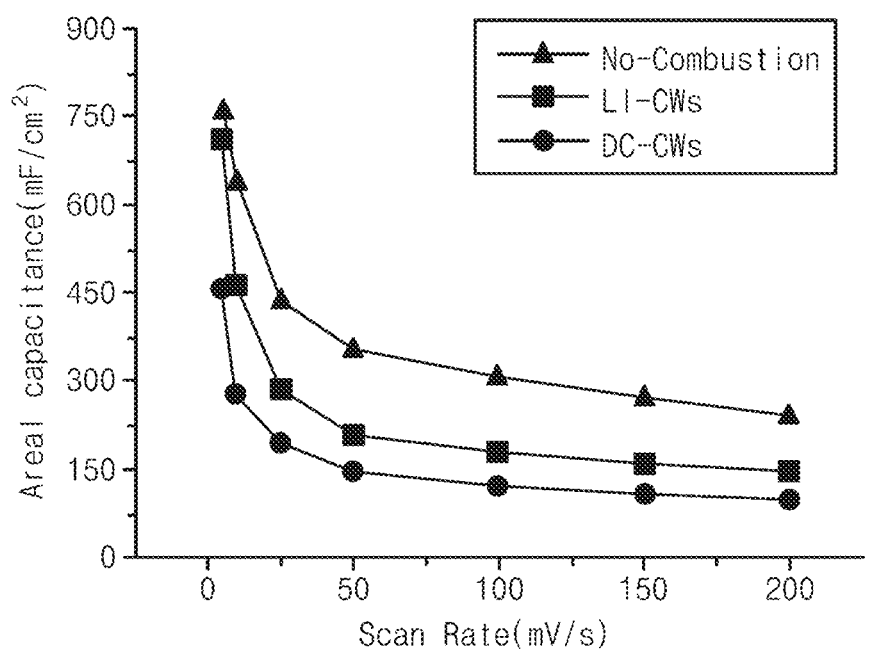
FIG. 13B illustrates results showing areal capacitances.

Referring to FIG. 13B, areal capacitances of three different electrodes are analyzed at various scanning rates of 5, 25, 50, 100 and 200 mV/s. Maximum areal capacitance for the three electrodes is obtained at a lowest scanning rate of 5 mV/s.

Areal capacitance of the $Mn_xO_y$/MWCNT-based electrodes fabricated by applying DC field-actuated combustion wave was highest capacitance of 190 $mF/cm^2$. Areal capacitance of the $Mn_xO_y$/MWCNT-based electrode fabricated by applying laser irradiation-driven combustion waves was 176 $mF/cm^2$. Areal capacitance of the $MnO_2$/MWCNT-based electrode was 116 $mF/cm^2$.

Areal capacitances of electrodes fabricated by applying laser-driven combustion waves and DC field-driven combustion waves were 163% and 152% larger than areal capacitance of an electrode fabricated without the combustion waves, respectively. Additionally, the $Mn_xO_y$/MWCNT-based electrode fabricated by applying DC field-driven combustion waves exhibits a lowest drop rate of areal capacitance with an increase in scanning rate. The drop rate is only 68% at 5 to 200 mV/s. However, the $Mn_xO_y$/MWCNT-based electrode fabricated by applying DC field-driven combustion waves and the $MnO_2$/MWCNT-based electrode fabricated by applying laser irradiation-driven combustion waves exhibit 80% and 79% of drop rates, respectively.

Growth of a nanorod synthesized by DC field-driven combustion waves and absence of aggregation of $Mn_xO_y$ may maintain charge transfer inside a one-dimensional structure. Moreover, a contact surface area between the electrode and the electrolyte may be maintained at a high scanning rate. However, an aggregated structure of the electrode fabricated by applying laser irradiation-driven combustion waves and a simple structure of $MnO_2$ and MWCNT are affected by an absolute size of the scanning rate because duration of a redox reaction is not sufficient.

Figure 13C:
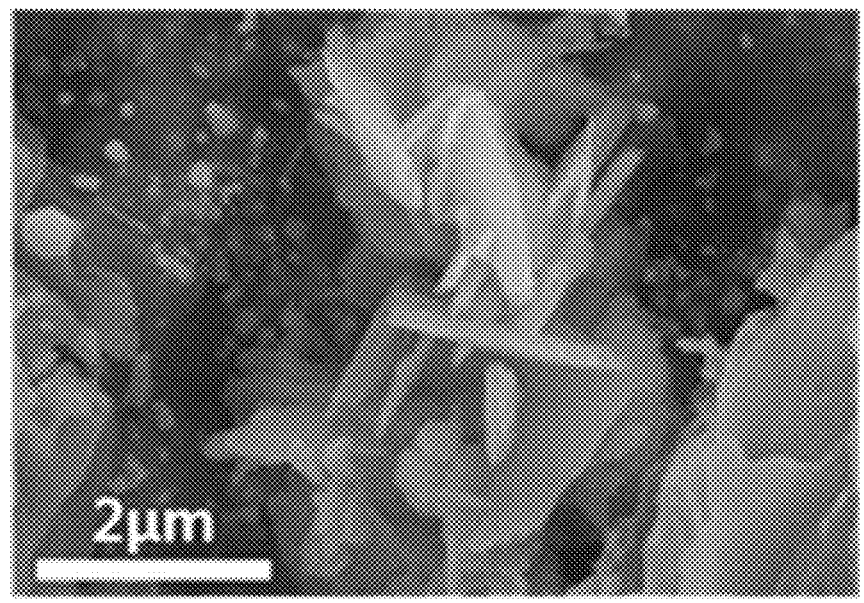
FIG. 13C is SEM image of a $Mn_xO_y$/MWCNT-based electrode fabricated by applying DC field-driven combustion waves before charge-discharge cycles.
Figure 13D:
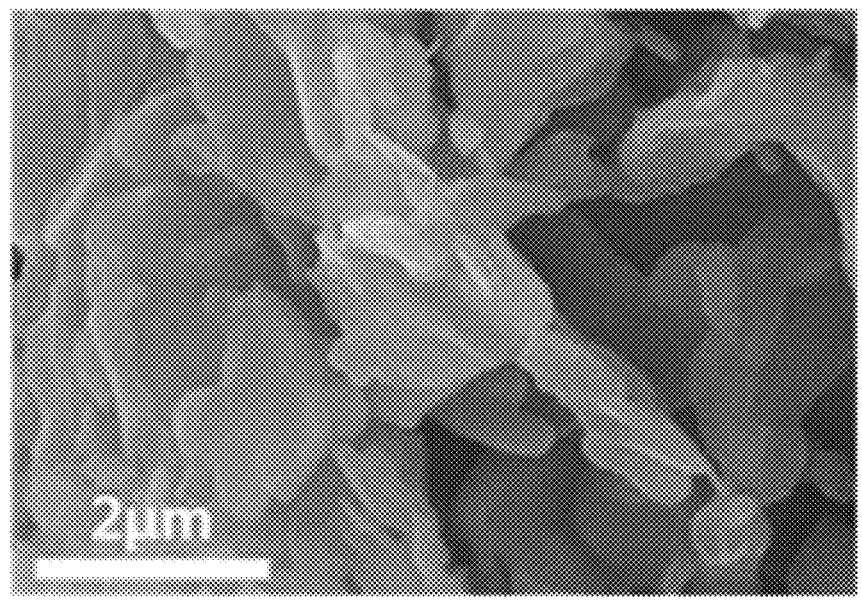
FIG. 13D is SEM image of a $Mn_xO_y$/MWCNT-based electrode fabricated by applying DC field-driven combustion waves after 10,000 charge-discharge cycles.

Referring to FIGS. 13C and 13D, SEM images of a $Mn_xO_y$/MWCNT-based electrode fabricated by applying DC field-driven combustion waves before and after 10,000 charge-discharge cycles are shown.

Before the cycling test, $Mn_xO_y$/MWCNT clearly indicates a mixture structure of nanorods and particles in micro-nanoscale. A sheet-like structure is a group of aligned nanorods. A charge-discharge test has been performed 10,000 times or more. As a result of the test, edges of the nanorods were slightly damaged, but the entire shape thereof remains in the same structure as the aligned nanorods and sheets. The $Mn_xO_y$/MWCNT-based electrode fabricated by applying combustion waves provides a stable structure that does not undergo severe performance degradation.

According to example embodiments of the present disclosure, a method of fabricating a structure-controlled metal oxide film has effects, as follows.

Firstly, a process may be performed in a short period of time using instantaneous combustion of a chemical fuel using DC power without creating special environments (long-term high temperature, vacuum, and low oxygen conditions) required to control a structure of conventional nanomaterials.

Secondly, a method of controlling a metal oxide nanostructure using a simple process may be provided to achieve higher physiochemical stability and a larger surface area than those of an electrode using a metal oxide in the form of individual particles may be provided.

Thirdly, a metal oxide structure using self-propagating combustion waves induced by DC power may be controlled. Accordingly, a structure-controlled metal oxide may improve a specific surface area and may be used as an electrode of an electrochemical device having high capacitance and stability. Moreover, the structure-controlled metal oxide may improve stability and performance through various electrochemical applications such as a supercapacitor and the like as well as battery and photocatalyst applications using nanomaterials.

Although the present disclosure and its advantages have been described in detail, it should be understood that various changes, substitutions and alterations can be made herein without departing from the spirit and scope of the disclosure as defined by the following claims.

What is claimed is:

1. A method of fabricating a metal oxide film, comprising:
sequentially laminating a carbon film and a metal oxide film including nano-sized metal oxide nanoparticles on a porous fuel membrane as a substrate made of a fuel material to form a preliminary composite structure; and
reducing the metal oxide film to form a composite structure by combusting the porous fuel membrane while applying a voltage to the preliminary composite structure.

2. The method according to claim 1, wherein the sequentially laminating a carbon film and a metal oxide film including nano-sized metal oxide nanoparticles on a porous fuel membrane to form a preliminary composite structure comprises:
dispersing a carbon nanotube or a graphene in a first dispersing agent solution to prepare a carbon-containing solution;
dispersing the metal oxide nanoparticles in a second dispersing agent solution to prepare a nanoparticle solution;
forming a carbon film on the porous fuel membrane using vacuum filtration of the carbon-containing solution;
forming the metal oxide film on the carbon film using vacuum filtration of the nanoparticle solution; and
evaporating the first dispersing agent solution and the second dispersing agent solution in the metal oxide film, the carbon film, and the porous fuel membrane to form the preliminary composite structure.

3. The method according to claim 1, wherein in the reducing the metal oxide film to form a composite structure by combusting the porous fuel membrane while applying a voltage to the preliminary composite structure, a combustion wave combusts the porous fuel membrane to heat the metal oxide nanoparticles,
a DC current applied to the preliminary composite structure induces arc discharge on a surface of the carbon film to evaporate the metal oxide nanoparticles, and
the metal oxide nanoparticles are reduced to control a structure thereof while the metal oxide nanoparticles are cooled after generation of the combustion wave.

4. The method according to claim 1, wherein the porous fuel membrane is nitrocellulose.

5. The method according to claim 1, wherein the metal oxide nanoparticles include $MnO_2$, and
a reduced metal oxide includes at least one of $Mn_2O_3$, $Mn_3O_4$, and MnO.

6. The method according to claim 1, wherein each of the metal oxide nanoparticles has a diameter of 10 nanometers to 200 nanometers.

7. The method according to claim 1, wherein each of the metal oxide nanoparticles has a spherical shape, and
a reduced metal oxide has a rod shape or a rounded polyhedral shape.

8. The method according to claim 7, wherein a nanostructure having the rod shape has a length of 50 nanometers to 700 nanometers and a thickness of 5 nanometers to 50 nanometers.

9. The method according to claim 1, wherein the carbon film is a filtration substrate made of a carbon nanotube or a graphene.

10. The method according to claim 1, wherein the voltage is a direct current (DC) voltage or an alternating current (AC) voltage.

* * * * *